United States Patent [19]
Sasaki

[11] Patent Number: 5,640,623
[45] Date of Patent: Jun. 17, 1997

[54] WIRELESS FLASH PHOTOGRAPHING SYSTEM IN WHICH LIGHT EMISSION CONTROL OF A SLAVE FLASH APPARATUS, SITUATED AWAY FROM A CAMERA, IS EFFECTED BY A LIGHT SIGNAL FROM A MASTER FLASH APPARATUS PROVIDED ON THE CAMERA SIDE

[75] Inventor: Toyoji Sasaki, Hachioji, Japan

[73] Assignee: Olympus Optical Co., Ltd., Tokyo, Japan

[21] Appl. No.: 505,706

[22] Filed: Jul. 21, 1995

[30] Foreign Application Priority Data

Jul. 29, 1994 [JP] Japan .................................. 6-179051
Jul. 29, 1994 [JP] Japan .................................. 6-179052

[51] Int. Cl.$^6$ .................................. G03B 7/00; G03B 15/05
[52] U.S. Cl. .................................. 396/180; 396/182; 396/189
[58] Field of Search .................................. 352/131, 132, 352/413–417; 396/180, 182, 189

[56] References Cited

U.S. PATENT DOCUMENTS

| 4,368,966 | 1/1983 | Hagyuda | 354/131 |
|---|---|---|---|
| 4,582,410 | 4/1986 | Niwaya et al. | 354/131 |
| 4,884,094 | 11/1989 | Kitaura et al. | 354/415 |
| 5,283,610 | 2/1994 | Sasaki | 354/416 |
| 5,384,611 | 1/1995 | Tsuji et al. | |
| 5,446,512 | 8/1995 | Mogamiya | 354/131 |

FOREIGN PATENT DOCUMENTS

| 53-130020 | 11/1978 | Japan . |
|---|---|---|
| 58-72929 | 5/1983 | Japan . |
| 61-45599 | 5/1986 | Japan . |
| 1-254925 | 10/1989 | Japan . |
| 4-343343 | 11/1992 | Japan . |
| 5-304423 | 12/1993 | Japan . |
| 6-267680 | 9/1994 | Japan . |

Primary Examiner—Safet Metjahic
Assistant Examiner—Michael Dalakis
Attorney, Agent, or Firm—Frishauf, Holtz, Goodman, Langer & Chick

[57] ABSTRACT

A wireless flash photographing system prohibits flash light reception for a predetermined time period when it is determined that received flash light is not an identification signal. Light emission for pre-confirming a shade and main light emission are switched by the identification signal. A flash device applied to this system comprises a power supply circuit section, a light emission section, a control section and a light receiving circuit section. The light emission section comprises a series circuit including a main capacitor, a discharge tube, a diode and an IGBT, a voltage doubler circuit including resistors and a capacitor, and a trigger circuit including a trigger transformer and a trigger capacitor. The light emission section controls the IGBT to start/stop light emission. A CPU of the control section is connected to a terminal X for transmitting a light emission start signal from a camera, a terminal TTL for transmitting a light emission stop signal from the camera, and a GND terminal, as well as to various switches. The CPU receives an identification signal for identifying modeling light emission and main light emission.

16 Claims, 14 Drawing Sheets

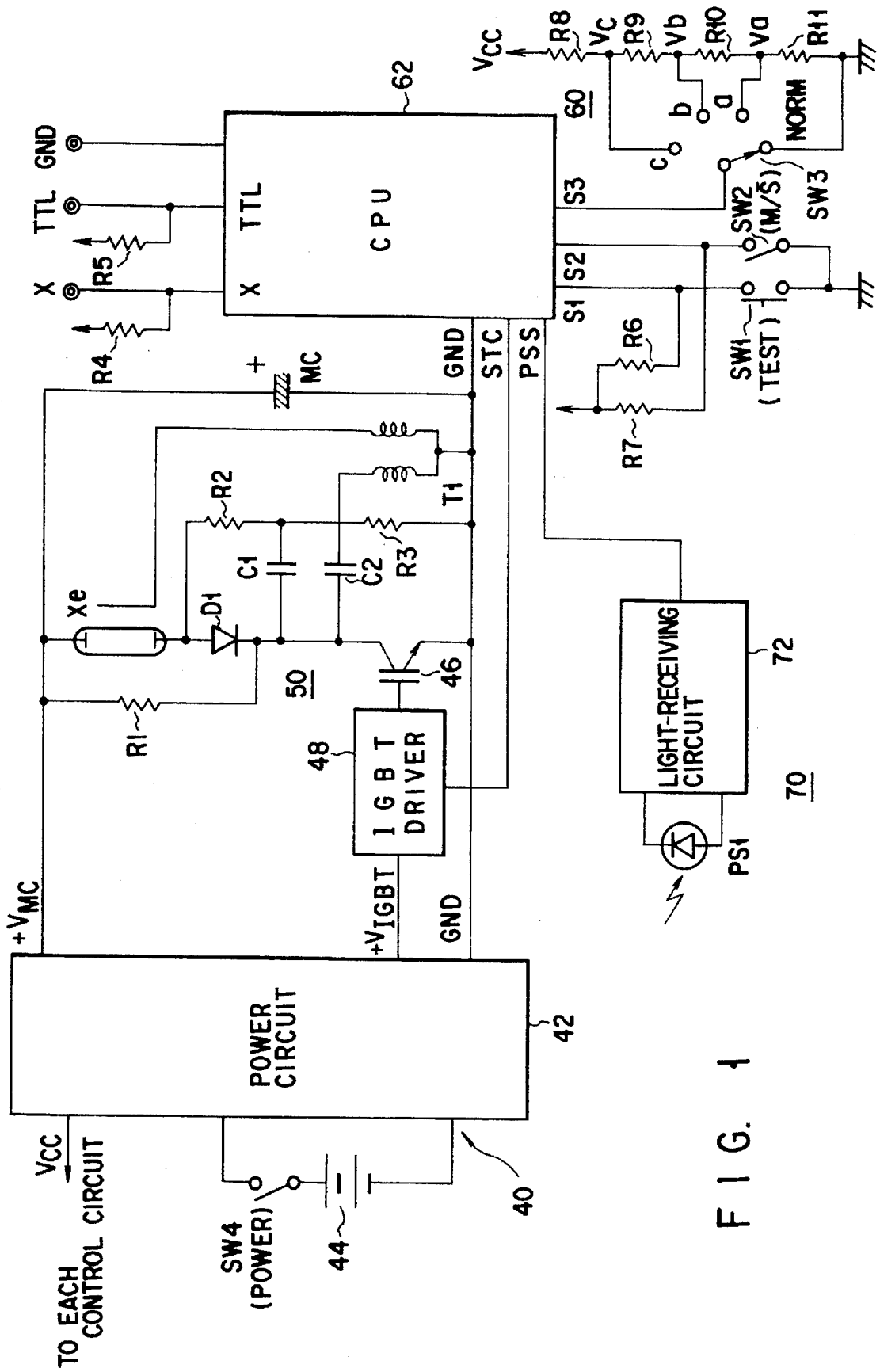
F I G. 1

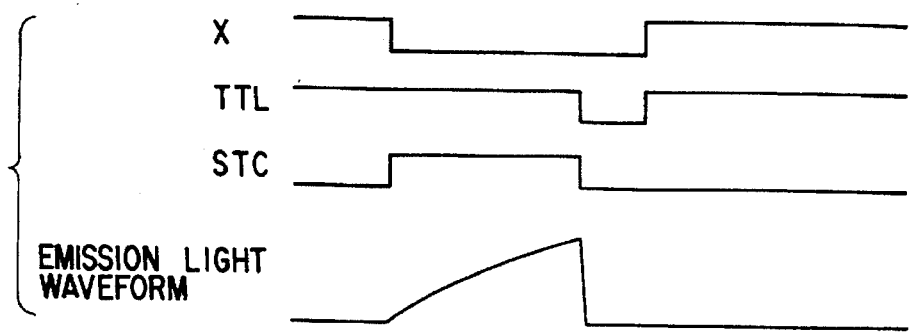
F I G. 6A
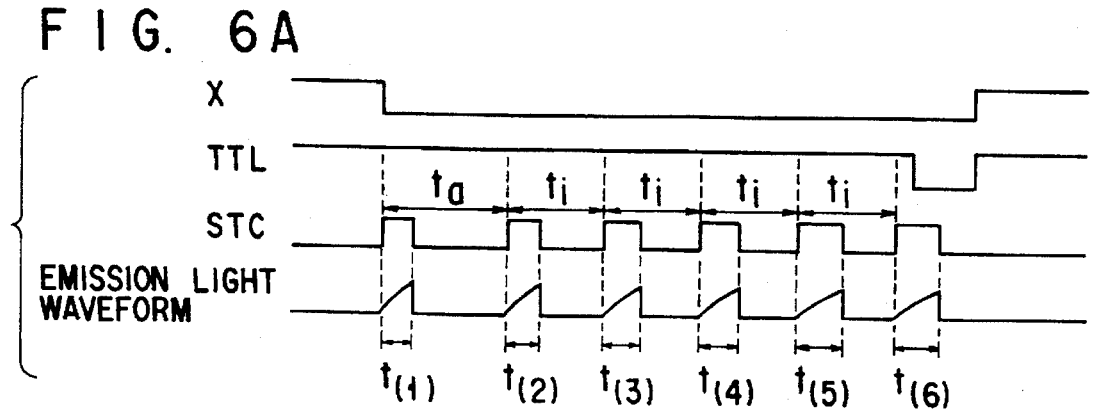
F I G. 6B
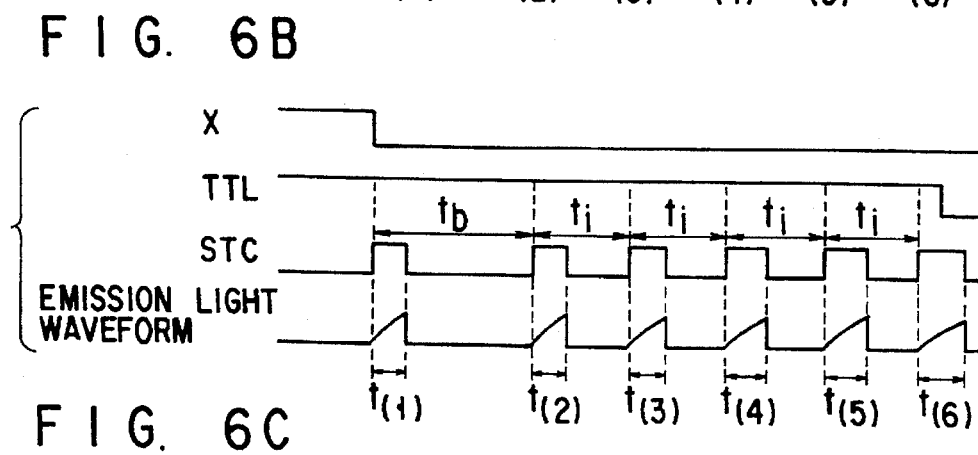
F I G. 6C
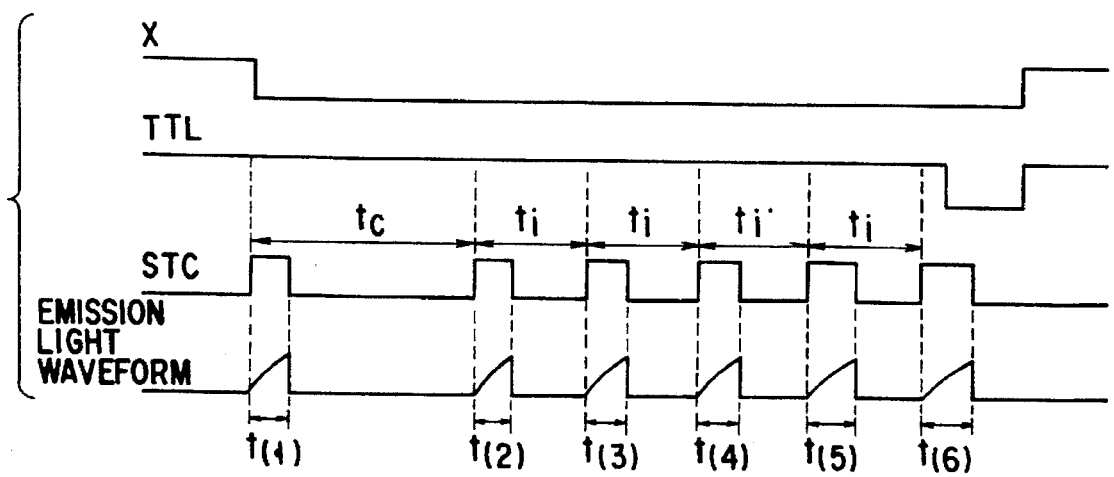
F I G. 6D

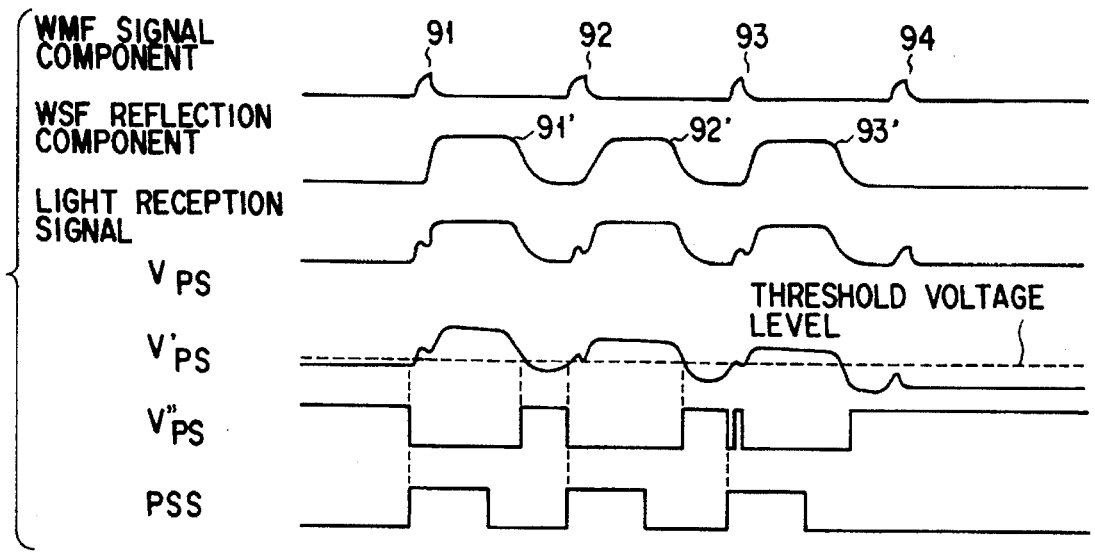
F I G. 11A
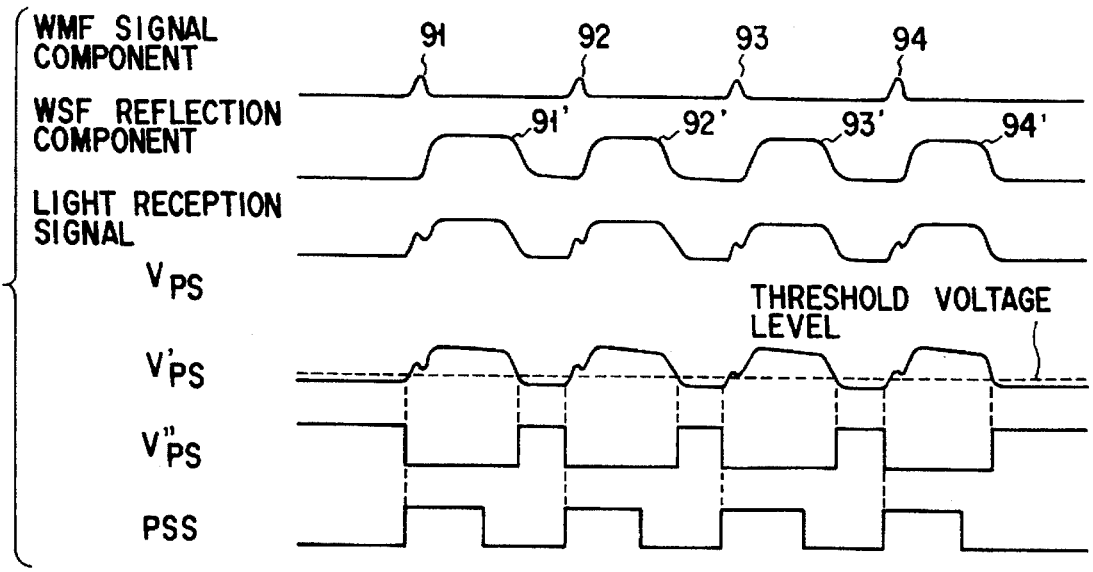
F I G. 11B

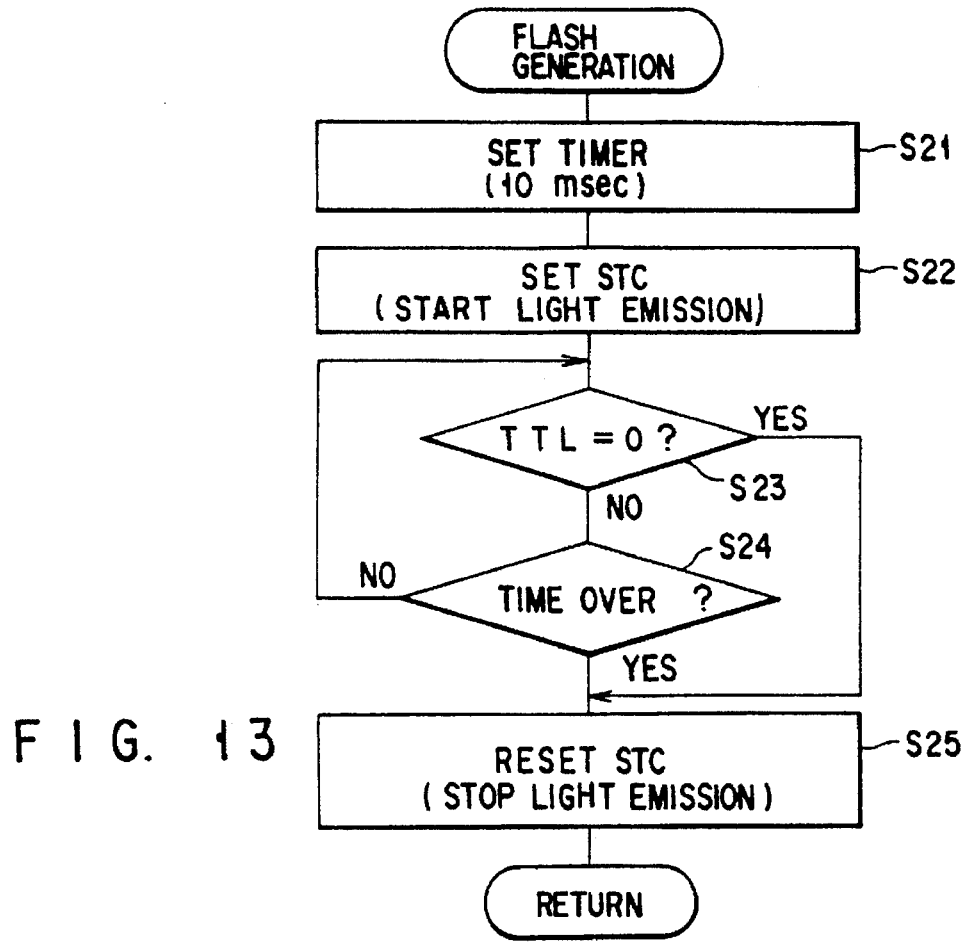
F I G. 13
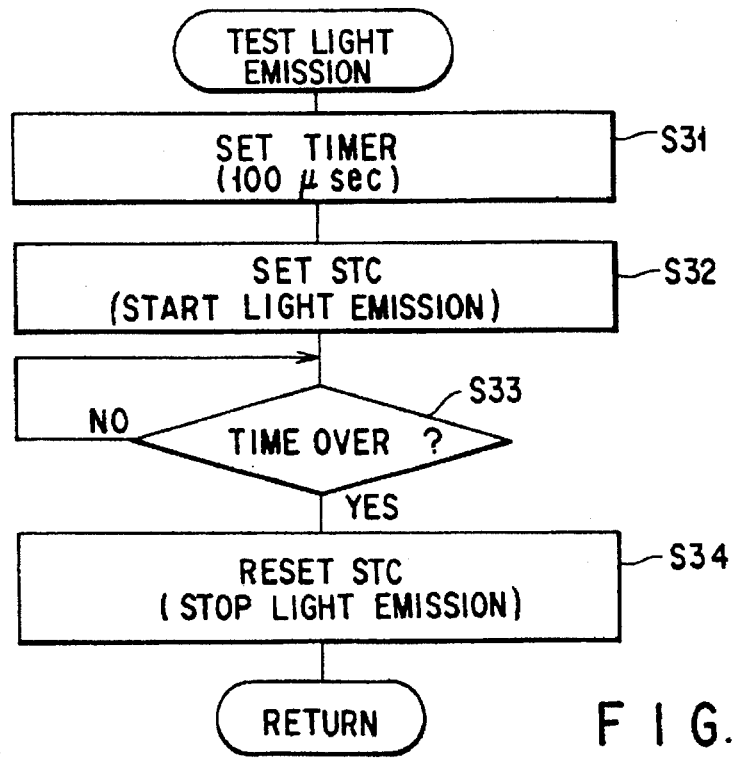
F I G. 14

WIRELESS FLASH PHOTOGRAPHING SYSTEM IN WHICH LIGHT EMISSION CONTROL OF A SLAVE FLASH APPARATUS, SITUATED AWAY FROM A CAMERA, IS EFFECTED BY A LIGHT SIGNAL FROM A MASTER FLASH APPARATUS PROVIDED ON THE CAMERA SIDE

BACKGROUND OF THE INVENTION

1. Field of the Invention

The present invention relates generally to a wireless flash photographing system and more particularly to a wireless flash photographing system in which light emission control of a slave flash apparatus, situated away from a camera, is effected by a flash light signal from a master flash apparatus provided in or on the camera.

2. Description of the Related Art

There is a conventional method of effectively using strobe light at the time of photographing, wherein a master flash and a slave flash, which is turned on by strobe light from the master flash, are used.

For example, Jap. Pat. Appln. KOKAI Publication No. 4-343343 (U.S. Pat. No. 5,384,611) discloses an example in which an identification signal of flash light is transmitted prior to moving a shutter front curtain. KOKAI No. 4-343343 also discloses that identification signals formed of a plurality of pulse beams are output from a flash apparatus built in or connected to a camera, and the identification signals are detected by a wireless flash not connected to the camera and received separately from other strobe light components.

In the technique of KOKAI 4-343343, however, the identification signal is output before the front curtain of the focal plane shutter is driven. In a camera system using this method, the identification signal needs to be output before moving the shutter front curtain. Thus, this method is not applicable to a camera which is not designed to output the signal before moving the shutter front curtain.

On the other hand, Jap. Pat. Appln. KOKAI Publication No. 61-45599 describes an example of "modeling light emission" using flash light, wherein an object is irradiated for a long time by making a light emission unit emit light intermittently. According to this example, even if a flash apparatus is not provided with a modeling lamp, shade can be confirmed in advance. Thus, the photographing is not failed.

In the meantime, it is possible to apply the technique of modeling light emission described in KOKAI No. 61-45599 to the wireless flash apparatus described in KOKAI No. 4-343343. In this case, however, the flash apparatus (hereinafter referred to as "master flash") built in or connected to the camera and the flash apparatus (hereinafter "slave flash") separated from the camera cannot be made to intermittently emit light at the same time. The reason for this is that if the light is intermittently emitted after the master flash has emitted a light emission start signal, the slave flash will stop light emission.

Even if the master flash and slave flash emit light simultaneously, the ratio of emission light in this case differs from that at the time of photographing. Consequently, the photographer fails to photograph an image which he had before the photographing. The reason for this is that the light emission method at the time of photographing is a so-called "successive light emission type light amount control method" in which the slave flash emits light first and then the master flash emits light, and the two flashes do not emit light simultaneously.

In addition, the applicant discloses in senior Japanese Patent Application No. 5-304423 a system wherein the light amount ratio, shade, etc. can be confirmed beforehand and the light emission can be controlled while maintaining a constant light amount ratio at the time of photographing upon receiving a proper light amount signal from the camera side or master flash side.

However, in the system of Patent Application No. 5-304423, the camera and master flash are connected by means of a connection cord. Thus, the design of this system is limited by the length of the connection cord.

SUMMARY OF THE INVENTION

An object of the present invention is to provide a wireless flash photographing system capable of controlling even if a normal camera is used.

Another object of the invention is to provide a wireless flash photographing system wherein erroneous light emission is prevented, in particular, when there is another system.

Still another object of the invention is to provide a wireless flash photographing system capable of achieving modeling light emission, irrespective of a limitation due to the length of a connection cord.

According to the invention, there is provided a master flash device of a wireless flash photographing system wherein a light emission control of at least one slave flash device situated apart from a camera can be effected by a light signal from the master flash device built in or mounted on the camera, the master flash device comprising: (a) mixing means for mixing an identification signal for the slave flash device in the light signal; (b) light emission means capable of emitting light intermittently; and (c) control means for controlling at least light emission start and light emission stop of the light emission means in response to an output from the mixing means, whereby the master flash device can vary a light emission interval.

According to the invention, there is also provided a slave flash device of a wireless flash photographing system wherein a light emission control of the slave flash device situated apart from a camera can be effected by a light signal from a master flash device built in or mounted on the camera, the slave flash device comprising: (a) light emission means capable of emitting light intermittently; (b) photoelectric conversion means for receiving the light signal and producing an electric signal; (c) separating means, connected to the photoelectric conversion means, for separating the electric signal into an identification signal and a control signal; (d) timer means for measuring a predetermined time period; and (e) control means for controlling light emission in response to the identification signal and the control signal, the control means invalidating the output electric signal for the predetermined time period when the identification signal is not directed to the control means itself.

According to the invention, there is also provided a wireless flash photographing system wherein a wireless light emission control of a slave flash device situated apart from a camera can be controlled by a light signal from a master flash device built in or mounted on the camera, the slave flash device including: (a) light receiving means for receiving the light signal; (b) light emission control means capable of controlling intermittent light emission; and (c) switching means for effecting switching between modeling light emission for confirming light distribution before exposure and main light emission for exposure on the basis of an identification signal, the identification signal being included in the light signal and designating an operation mode of the slave flash device, wherein in the wireless flash photographing system the slave flash device is made to emit light intermittently at the time of the modeling light emission and the light emission time interval and the number of light emission are controlled.

According to the invention, there is also provided a wireless flash photographing system wherein a wireless light emission control of a slave flash device situated apart from a camera can be controlled by a light signal from a master flash device built in or clipped on the camera, the slave flash device including: (a) light receiving means for receiving the light signal; (b) light emission control means capable of controlling intermittent light emission; (c) a plurality of timer means for measuring different predetermined time periods, respectively; and (d) switching means for effecting switching between modeling light emission for confirming light distribution before exposure and main light emission for exposure on the basis of an identification signal, the identification signal being included in the light signal and designating an operation mode of the slave flash device, wherein in the wireless flash photographing system the slave flash device is made to emit light intermittently at the time of the modeling light emission and the light emission time interval and the number of light emission are controlled.

According to the invention, there is also provided a flash device for use in a wireless flash photographing system wherein a light emission control of at least one slave flash device situated apart from a camera can be effected by a light signal from a master flash device provided on the camera side, the flash device comprising: (a) device selection means for selecting the function of the flash device as one of the master flash device and the slave device; (b) light emission mode selecting means for selecting one of a flash generation mode and at least two pulse light emission modes; and (c) a test light emission switch for starting test light emission for confirming one of a light distribution for an object to be photographed and a state in which the device is ready to emit light, wherein the flash device, when the test light emission switch is operated in the flash generation mode, emits light for a predetermined time period or fully emits light, and the flash device, when the test light emission switch is operated in the pulse light emission mode, emits light intermittently for confirming the light distribution for the object.

According to the invention, there is also provided an improvement of a wireless flash photographing system wherein a light emission control of a slave flash device situated apart from a camera can be effected by a light signal from a master flash device provided on the camera side, (a) the master flash device including: identification signal generating means for generating an identification signal containing at least one of a selection signal for the slave flash device and a generation mode designation signal; and light emission control means for enabling intermittent light emission modulated on the basis of the identification signal, and (b) the slave flash device including: light receiving means for receiving the intermittent light from the master flash device; signal discriminating means for extracting the identification signal by demodulating the received light; and control means for controlling a light emission operation on the basis of the extracted identification signal, such that light is emitted in synchronism with light emission of the master flash device at the time of film exposure, wherein the slave flash device ignores the received light for a predetermined time period when the identification signal does not coincide with a predetermined identification code.

According to the invention, there is also provided a wireless flash photographing system comprising a master flash device built in or mounted on a camera and at least one slave flash device, separated from the camera, for emitting light under the control by a light signal from the master flash device, the master flash device including: (a) first signal generating means for generating a first signal in response to a light emission start signal produced at the time of a photographing operation; (b) second signal generating means for generating a second signal in response to a light emission start signal produced irrespective of the photographing operation; (c) light emission control means for generating signals of at least two different light emission intervals on the basis of the signals from the first and second signal generating means; and (d) light emission means for emitting light intermittently in response to the signals from the light emission control means, and the slave flash device including: (a) light receiving means for receiving flash light from the master flash device; (b) light emission control means for controlling light emission for a predetermined time period in response to an output from the light receiving means; and (c) light emission means for emitting light in response to an output from the light emission control means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 1 is a circuit showing the structure of a flash device of a wireless flash photographing system according to an embodiment of the present invention;

FIGS. 6A through 6D illustrate light emission modes of the flash device, in which FIG. 6A shows waveforms in the case of "NORM", FIG. 6B shows waveforms in the case of "a" channel, FIG. 6C shows waveforms in the case of "b" channel, and FIG. 6D shows waveforms in the case of "c" channel;

FIG. 11A shows waveforms obtained when a diode D22 is removed from the light receiving circuit shown in FIG. 4;

FIG. 11B shows waveforms obtained with the light receiving circuit shown in FIG. 4 (provided with the diode D22);

FIG. 13 is a flow chart illustrating a subroutine of the operation of flash generation;

FIG. 14 is a flow chart illustrating a subroutine of the operation of test light emission;

DETAILED DESCRIPTION OF THE PREFERRED EMBODIMENT

An embodiment of the present invention will now be described with reference to the accompanying drawings.

Figure 2:
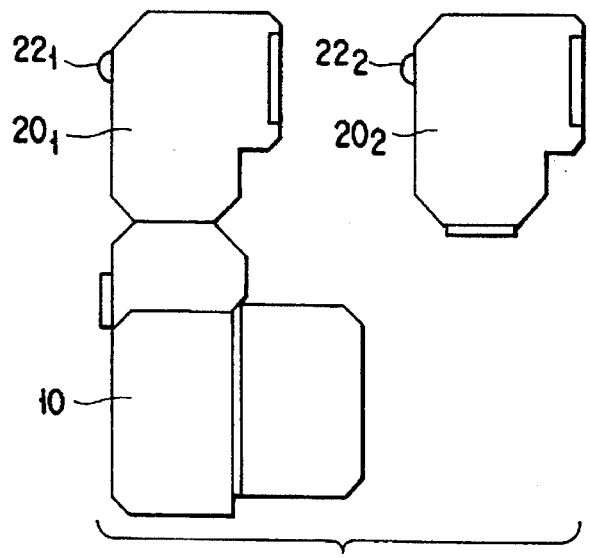
FIG. 2 shows the structure of the wireless flash photographing system according to the embodiment of the invention.

FIG. 2 shows the structure of the wireless flash photographing system according to the embodiment of the invention.

The photographing system comprises a camera body 10 and at least two flash devices $20_1$ and $20_2$ which are identical and can be detachably attached to the camera body 10. The rear faces of the flash devices $20_1$ and $20_2$ are provided with photosensors $22_1$ and $22_2$. The photosensors $22_1$ and $22_2$ may be provided on front faces or side faces of the flash devices $20_1$ and $20_2$, and a plurality of photosensors may be provided on each of the flash devices $20_1$ and $20_2$.

In the following, wireless flash photographing using two flash devices will be described. One of the flash devices, $20_1$, is attached to the camera body 10 as a wireless master flash (WMF). The flash device $20_2$ is not attached to the camera body 10 and situated away from the camera body 10 as a wireless slave flash F(WSF).

Figure 3:
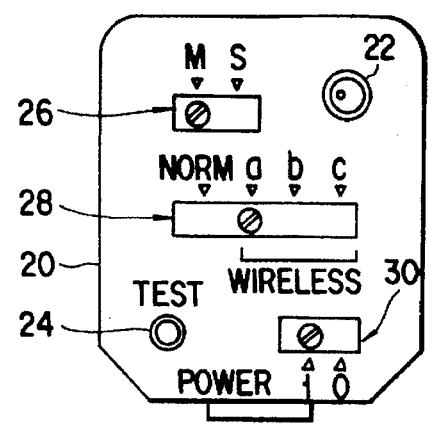
FIG. 3 shows an operation panel on the rear face of the flash device.

FIG. 3 shows an operation panel on the rear face of the flash device. In FIG. 3, the flash device is denoted by "20" and the photosensor by "22".

The operation panel is formed on the rear face of the flash device 20, and various modes described below can be set. The photosensor 22 is provided on the upper right portion in FIG. 3. Flash light can be received by the photosensor 22. A push switch 24 for test light emission, indicated by "TEST", is provided on the lower left portion. When the switch 24 is pushed in a normal flash generation mode, test light emission with a predetermined light amount is effected. On the other hand, when the switch 24 is pushed in a wireless light emission mode, intermittent successive light emission for irradiating the object at visualized time intervals (hereinafter referred to as "modeling light emission") is effected.

The upper left portion of the rear panel is provided with a slide switch 26 for selecting a master flash side ("M") or a slave flash side ("S") at the time of wireless flash photographing. A slide switch 28 capable of setting one of four channel modes, "NORM", "a", "b" and "c", is provided below the slide switch 26.

Of the four modes of the slide switch 28, the mode "NORM" indicated on the leftmost position is associated with normal flash generation, and the other three modes "a", "b" and "c" are associated with wireless flash photographing. Specifically, the latter three modes are associated with the "a" channel, "b" channel and "c" channel.

In addition, a sliding power switch 30 indicated by characters "POWER" is provided on the lower right portion of the rear panel. When the power switch 30 is set at "I" position, the power is turned on. When the switch 30 is set at "0" position, the power is turned off.

FIG. 1 is a circuit diagram showing the structure of the above-described flash device.

The circuitry of the flash device comprises a power supply circuit section 40, a light emission section 50, a control section 60 and a light receiving circuit section 70.

A power supply circuit 42 in the power supply circuit section 40 has three functions: 1) to boost a low voltage output of a cell 44 connected to the power supply circuit 42 to a high voltage $+V_{MC}$, 2) to generate a voltage $+V_{IGBT}$ of an IGBT driver 48 for driving an IGBT (Insulated-Gate Bipolar Transistor) 46, and 3) to generate a power supply voltage $V_{CC}$ for driving circuits. A power supply switch SW4 (POWER: corresponding to power supply switch 30) is connected in series to an element for supplying a cell voltage. When the switch SW4 is turned on, the power supply circuit 42 starts to operate. When the switch SW4 is turned off, the operation of the power supply circuit 42 stops. Since the details of the power supply circuit 42 are well known, a detailed description thereof is omitted here.

The light emission section 50 comprises a series circuit having a main capacitor MC, a discharge tube Xe, a capacitor D1 and a switching element (IGBT) 46, a voltage doubler circuit having resistors R1 to R3 and a capacitor C1, and a trigger circuit having a trigger transformer T1 and a trigger capacitor C2. In the light emission section 50, when the IGBT 46 or switching element is turned on, the charge in the trigger capacitor C2 flows to the primary winding of the trigger transformer T1 and a high voltage is produced in the secondary winding of the trigger transformer T1, thereby exciting the discharge tube Xe.

At this time, the voltage at a connection portion between the discharge tube Xe and capacitor D1 is temporarily set at $-V_{MC}$ by virtue of the function of the voltage doubler circuit. Thus, a voltage of $+V_{MC}-(-V_{MC})=2V_{MC}$ is applied to the discharge tube Xe and the discharge tube Xe tends to easily emit light. Specifically, in this circuit, the start and stop of light emission is controlled only by controlling the IGBT 46.

The control section 60 comprises a CPU 62 and connection terminals between the aforementioned switch and the camera (not shown).

Specifically, the connecting section with the camera (not shown) is provided with three terminals. One of the three terminals is a terminal X for transmitting a light emission start signal from the camera, another is a terminal TTL for transmitting a light emission stop signal from the camera, and the other is a terminal GND. The terminal X and terminal TTL are pulled up by resistors R4 and R5. When the terminals X and TTL are short-circuited on the camera side, the light emission start/stop signal is transmitted to the CPU 62 within the flash device.

A switch SW1 (TEST) connected to the CPU 62 is a push switch which corresponds to the push switch 24 shown in FIG. 3. A signal S1 is normally pulled up to H-level by a pull-up resistor R6. When the switch SW1 is turned on, the signal S1 is set at L-level.

A switch SW2 (M/S) corresponds to the slide switch 26 in FIG. 3. When the switch 26 is set at "M" position, the switch SW2 is turned off. When the switch 26 is set at "S" switch, the switch SW2 is turned on. Since the switch SW2 is also pulled up by a resistor R7, an H-level signal is obtained when the switch SW2 is set at "M" position and an L-level signal is obtained when the switch SW2 is set at "S" position.

A switch SW3 comprises a slide switch (corresponding to the slide switch 28 shown in FIG. 3) having four selectable positions. One of modes "NORM", "a", "b" and "c" is selected. The four contact points associated with the four modes are connected to series-connected resistors R8 to R11. The "NORM" mode corresponds to 0 V, the "a" mode to $V_a$, the "b" mode to $V_b$, and the "c" mode to $V_c$. One terminal of the switch SW3 is connected to the terminal of the CPU 62 for signal S3, and the CPU 62 directly detects the selected voltage.

The CPU 62 receives signals from these terminals and switches, detects a signal PSS from the light receiving circuit 72, and outputs a signal STC for driving the IGBT driver 48 to control light emission. In FIG. 1, the symbol "GND" represents the ground potential. The IGBT driver 48 and light receiving circuit 72 will be described later.

Figure 4:
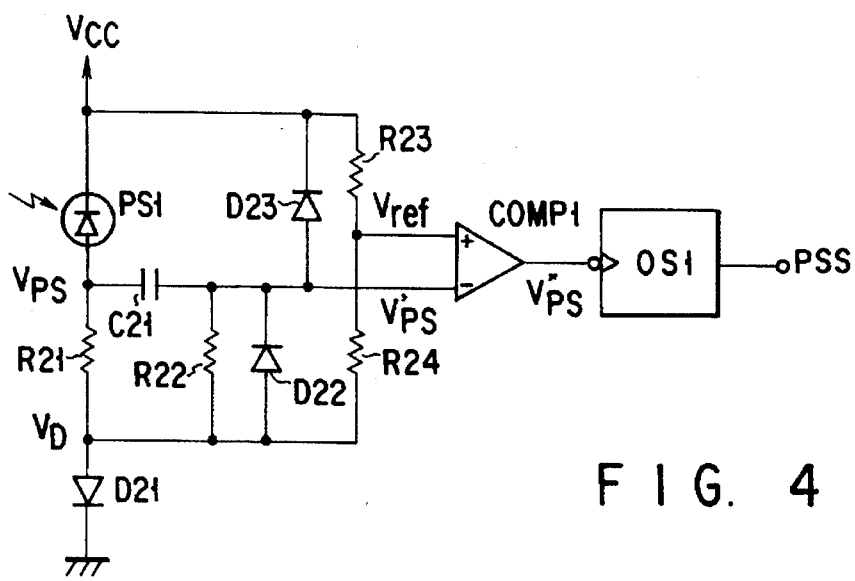
FIG. 4 is a circuit diagram showing in detail a light receiving circuit section of the flash device shown in FIG. 1.

FIG. 4 is a circuit diagram showing the light receiving circuit section 70.

The light receiving circuit 70 comprises a photosensor PS1 (corresponding to numeral "22" in FIG. 3) and light receiving circuit 72.

In the case where the flash device is a wireless slave flash, a flash signal from an external wireless master flash is received by the photosensor PS1. The received signal is converted to a voltage value by a resistor R21 connected in series to the photosensor PS1, thereby deriving an optical current.

The voltage value $V_{PS}$ in FIG. 4 includes a noise signal other than flash light (e.g. cyclic noise of a fluorescent lamp, disturbance light from a head lamp of an automobile, etc.). In order to eliminate the noise signal, an output is obtained through a differential circuit comprising a capacitor C21 and a resistor R22. The output value $V_{PS}'$ is kept at a proper level by diodes D22 and D23 and is input to a negative input terminal of a voltage comparator COMP1. On the other hand, a reference voltage $V_{ref}$ divided by resistors R23 and R24 is input to a positive input terminal of the voltage comparator COMP1.

The lower limit values of these voltages are raised from the ground potential by a degree corresponding to a diode D21 connected in series to the resistor R21. The reason for this will be explained later.

The voltage comparator COMP1 compares the voltage values $V_{PS}'$ and $V_{ref}$. If $V_{PS}'$ is greater, an L-level signal is output. In the opposite case, an H-level signal is output. An output signal $V_{PS}''$ of the voltage comparator COMP1 is input to an input section of a one-shot circuit OS1. The one-shot circuit OS1 detects a falling edge (a transition period from "H" to "L") of $V_{PS}''$ and outputs a pulse of a predetermined width. A signal PSS from the one-shot circuit OS1 is supplied to the CPU 62, as shown in FIG. 1.

Figure 5:
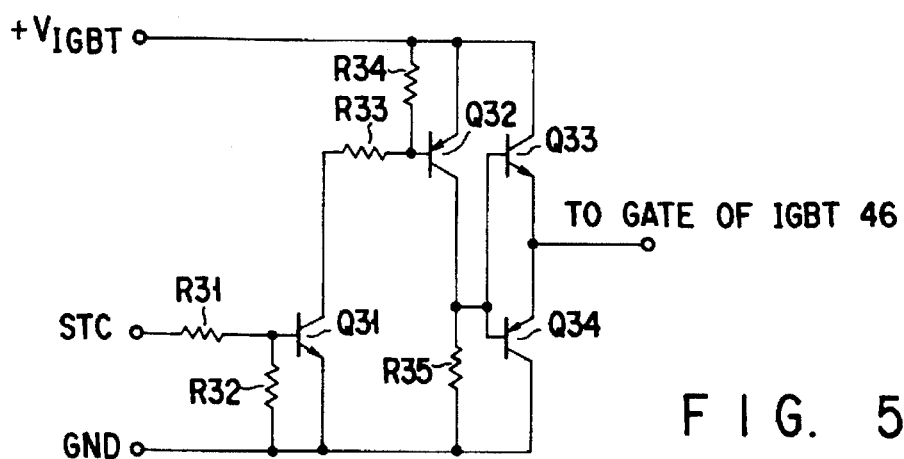
FIG. 5 is a circuit diagram showing in detail an IGBT driver circuit shown in FIG. 1.

FIG. 5 is a circuit diagram showing in detail the IGBT driver circuit 48 for turning on/off the IGBT 46 by applying a predetermined voltage to the gate of the IGBT 46.

In FIG. 5, a control terminal STC is used when the CPU 62 shown in FIG. 1 controls the IGBT 46. When an H-level signal is supplied to the terminal STC, the IGBT 46 is turned on. When an L-level signal is supplied to the terminal STC, the IGBT 46 is turned off. The driver circuit 48 is a complementary push-pull driver, and can easily control the turning on/off of the IGBT 46 by operating the control terminal STC.

The operation of the circuit 48 will now be described. When the terminal STC is at L-level, a transistor Q31 is turned off by a signal from resistors R31 and R32. As a result, a transistor Q32 is turned off by a signal from resistors R33 and R34. Since the base potentials of two complementary transistors Q33 and Q34 are set at a ground (GND) level by a resistor R35, the transistor Q34 is turned on and the transistor Q33 is turned off. A ground-level voltage is applied to the gate of the IGBT 46 and the IGBT 46 is turned off.

On the other hand, when the terminal STC is at H-level, the transistor Q31 is turned on and accordingly the transistor Q32 is turned on. Since a voltage $+V_{IGBT}$ is applied to the bases of the transistors Q33 and Q34, the transistor Q33 is turned on and the transistor Q34 is turned off. Thus, the voltage $+V_{IGBT}$ is applied to the gate of the IGBT 46 and the IGBT 46 is turned on.

The light emission modes of the flash device will now be described with reference to FIGS. 6A through 6D and 7.

FIG. 6A shows waveforms in the case of "NORM".

When the switch SW3 is set at "NORM," the flash device is set in the flash generation mode by a light emission start signal and a light emission stop signal.

If the terminal X is set at L-level, the CPU 62 determines that the light emission start signal has been input, and the STC is set at H-level. Thus, the IGBT 46 is turned on and light emission starts. Then, if the terminal TTL is set at L-level, the CPU 62 determines that the light emission stop signal has been input, and sets the terminal STC at L-level. In this case, the IGBT 46 is turned off and the light emission is stopped.

With reference to FIG. 6B, the waveforms in the case of the channel "a" will now be described.

FIG. 6B shows waveforms in the case where the switch SW2 is set at "M" ("wireless master flash") and the switch SW3 is set at "a".

If the terminal X is set at L-level in this mode, the CPU 62 starts the light emission operation of the wireless master flash. The CPU 62 outputs flash pulse light for a light emission time period $t_{(1)}$, while the terminal STC is being controlled. After a time period $t_a$, the CPU 62 outputs flash pulse light for a light emission time period $t_{(2)}$. Then, at a time interval $t_i$, flash pulse light is successively output for light emission time periods $t_{(2)}, t_{(3)}, \ldots$. This pulse light sequence is continued until the signal at the terminal TTL goes to L-level or until light pulses are emitted 15 times.

FIG. 6C shows waveforms in the case where the switch SW2 is set at "M" ("wireless master flash") and the switch SW3 is set at "b".

If the terminal X is set at L-level in this mode, the CPU 62 starts the light emission operation of the wireless master flash. The CPU 62 outputs flash pulse light for a light emission time period $t_{(1)}$, while the terminal STC is being controlled. After a time period $t_b$, the CPU 62 outputs flash pulse light for a light emission time period $t_{(2)}$. Then, at a time interval $t_i$, flash pulse light is successively output for light emission time periods $t_{(2)}, t_{(3)}, \ldots$. This pulse light sequence is continued until the signal at the terminal TTL goes to L-level or until light pulses are emitted 15 times.

FIG. 6D shows waveforms in the case where the switch SW2 is set at "M" ("wireless master flash") and the switch SW3 is set at "c".

If the terminal X is set at L-level in this mode, the CPU 62 starts the light emission operation of the wireless master flash. The CPU 62 outputs flash pulse light for a light emission time period $t_{(1)}$, while the terminal STC is being controlled. After a time period $t_c$, the CPU 62 outputs flash pulse light for a light emission time period $t_{(2)}$. Then, at a time interval $t_i$, flash pulse light is successively output for light emission time periods $t_{(2)}, t_{(3)}, \ldots$. This pulse light sequence is continued until the signal at the terminal TTL goes to L-level or until light pulses are emitted 15 times.

Figure 7:
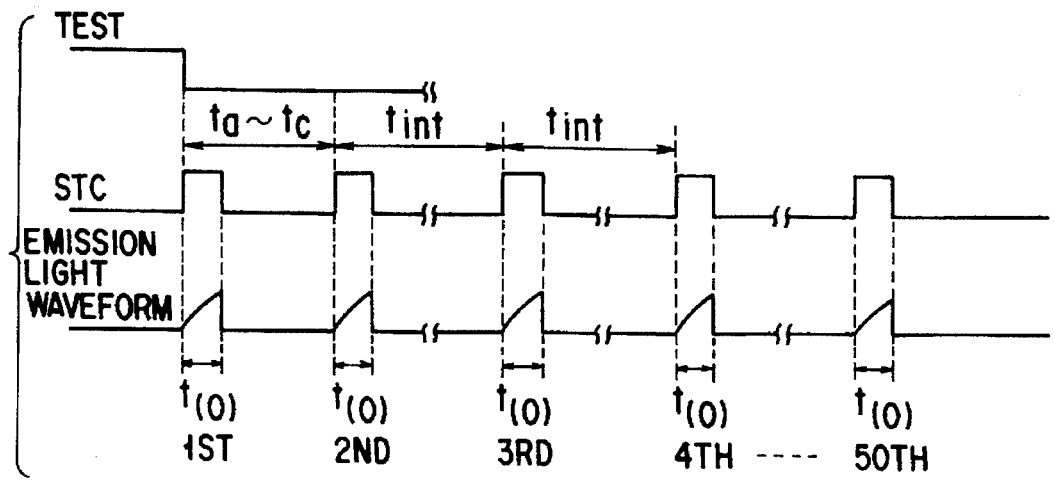
FIG. 7 illustrates a light emission mode of the flash device and, specifically, shows waveforms in a wireless modeling light emission mode.

FIG. 7 shows waveforms in the case where the switch SW2 is set at "M" ("wireless master flash") and the switch SW1 (switch 24) has been depressed while the switch SW3 is set at "a," "b" or "c" (i.e. waveforms at the time of wireless modeling light emission).

In this mode, the CPU 62 outputs flash pulse light for a first light emission time period $t_{(0)}$ by controlling the terminal STC. Then, flash light pulses are output for a light emission time period $t_{(0)}$ at a light emission interval $t_a$ in the channel "a" mode, at a light emission interval $t_b$ in the channel "b" mode, and at a light emission interval $t_c$ in the channel "c" mode.

Thereafter, light pulses are output for a light emission time period $t_{(0)}$ at an interval $t_{int}$. The light pulse emission is stopped after 50 pulses have been output. The light emission interval $t_{int}$ is much greater than the light emission interval $t_i$ for the light emission of the wireless master flash.

In this embodiment, as will be described later, the time periods are set as follows: $t_a$=350 μsec, $t_b$=400 μsec, $t_c$=450 μsec, $t_i$=300 μsec, $t_{int}$=22 msec, $t_{(1)}$ to $t_{(15)}$=30 to 150 μsec, and $t_{(0)}$=30 μsec.

Figure 8:
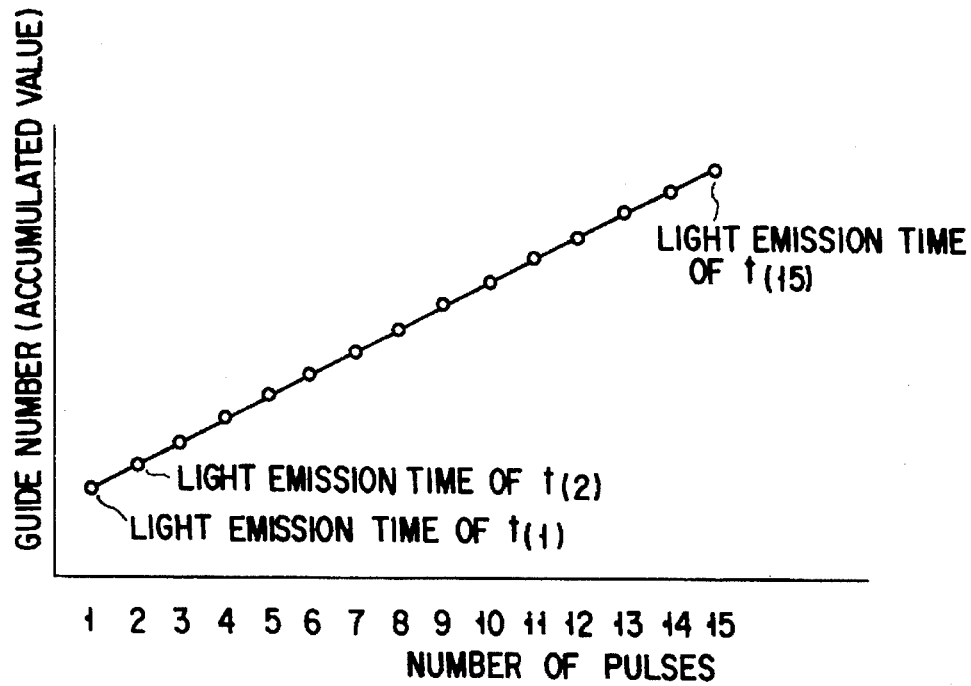
FIG. 8 is a graph showing the relationship between the number of pulses and a guide number at the time of intermittent successive light emission.

With reference to FIG. 8, the relationship between the number of pulses and a guide number in the intermittent successive light emission mode will now be described.

The wireless master flash performs intermittent successive light emission of 15 pulses at maximum (14 pulses at maximum on the wireless slave flash side) at the time of wireless photographing light emission. The light emission time in this case is $t_{(1)}$ to $t_{(15)}$. FIG. 8 shows the relationship between the number of pulses and the guide number (accumulated value) in the case of the intermittent successive light emission on the basis of this set light emission time.

As is shown in FIG. 8, the relationship between the number of pulses and the guide number is substantially linear. Inversely speaking, the light emission time is set so as to obtain substantially linear characteristics.

Figure 9A:
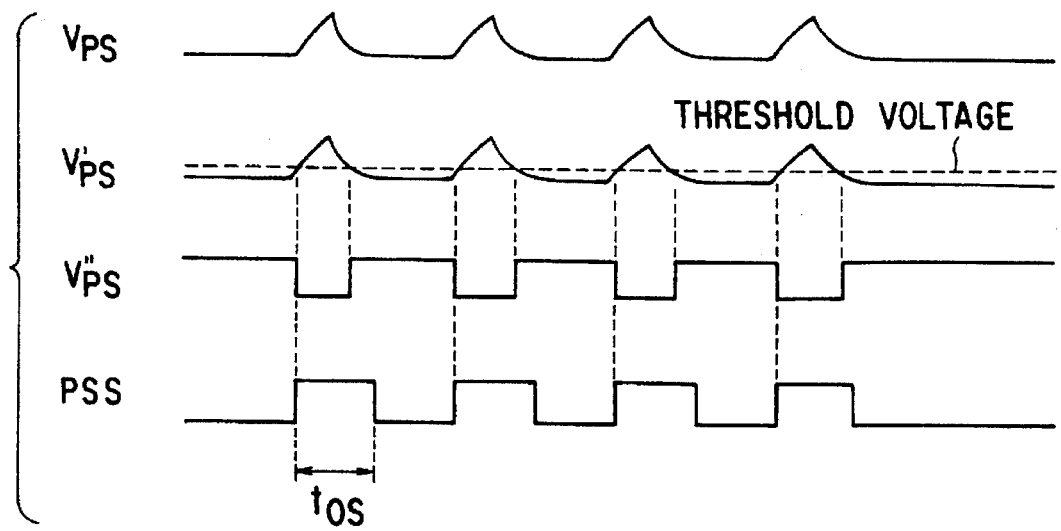
FIG. 9A shows reception signal waveforms in the light receiving circuit in the case where the amount of received light is proper.
Figure 9B:
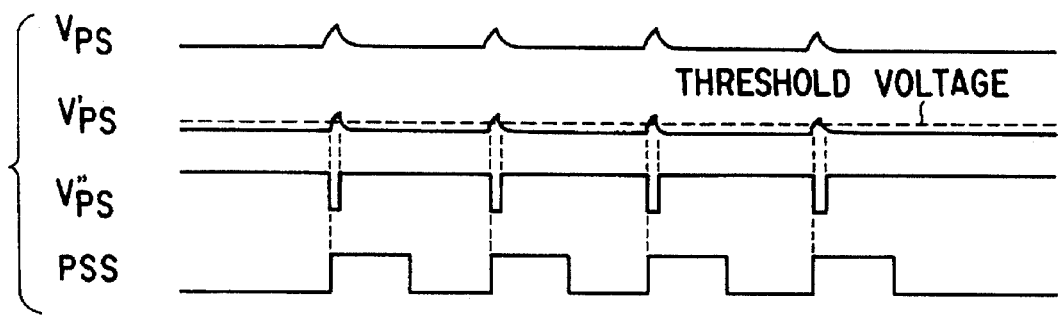
FIG. 9B shows reception signal waveforms in the light receiving circuit in the case where the amount of received light is too small.
Figure 9C:
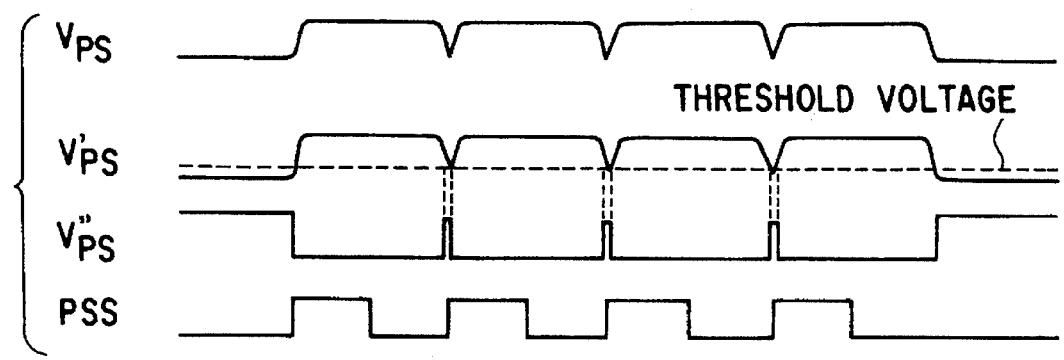
FIG. 9C shows reception signal waveforms in the light receiving circuit in the case where the amount of received light is too great.

With reference to FIGS. 9A through 9C, a description will now be given of signal waveforms obtained in the case where the light receiving circuit 72 receives signals from the flash device which is used as wireless slave flash (WSF).

FIG. 9A shows waveforms in the case where the magnitude of a signal $V_{PS}$ received by the photosensor PS1 and resistor R21 is proper.

The signal $V_{PS}$ is rid of external light by the differential circuit of the capacitor C21 and resistor R22 ($V_{PS}'$) and then waveform-shaped by the voltage comparator COMP1 ($V_{PS}''$). A falling edge of the signal $V_{PS}''$ is read and the one-shot circuit OS1 outputs a pulse signal PSS remaining at H-level for a predetermined time period $t_{OS}$.

FIG. 9B shows waveforms in the case where the magnitude of the signal received from the wireless master flash is small, and FIG. 9C shows waveforms in the case where the magnitude of the signal received from the wireless master flash is great. As regards these signals, the "L" width or "H" width of the waveform-shaped signal $V_{PS}''$ is very small. There is a concern that the CPU 62 cannot detect the signal with small time width.

However, the one-shot circuit OS1 converts the input signal to a pulse signal with predetermined time width $t_{OS}$ and the pulse signal is output to the CPU 62, the CPU 62 can read with the signal without fail.

Figure 10:
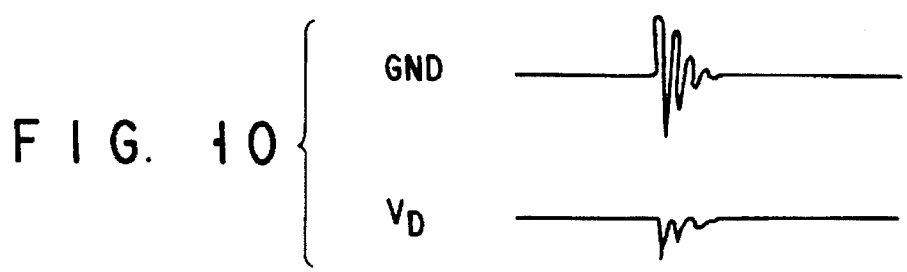
FIG. 10 shows a waveform of a ground potential GND on which noise is superimposed.

FIG. 10 shows a waveform of a ground potential GND on which noise is superimposed.

The reception sensitivity of the light receiving circuit 72 may be enhanced by decreasing the threshold voltage $V_{ref}$ input to the positive input terminal of the voltage comparator COMP1 or increasing the resistor R21. In this case, however, the circuit 72 becomes more susceptible to noise.

Under the circumstances, this circuit is designed to be less susceptible to noise even if the sensitivity is enhanced. For example, this circuit is provided with a differential circuit for eliminating external light. This differential circuit can eliminate noise with an optical intensity varying at a relatively slow cycle, for example, in a fluorescent lamp.

In addition, the flash device includes circuits, such as a boost circuit using a transformer and a trigger circuit, which make the power supply unstable. Because of this, noise may often enter via the ground. FIG. 10 shows an example of the waveform of a GND (ground)-level signal containing noise.

In this embodiment, the diode D21 is inserted in the light receiving circuit 72 in order to reduce influence of noise (see FIG. 4). Even if noise is superimposed on the GND-level signal, as shown in FIG. 10, a current is let to flow only in one direction. In addition, when the current is not made to flow, the diode D21 will function as a capacitor. By this function, the influence by noise can be reduced remarkably.

Symbol $V_D$ denotes an anode-side waveform of the diode D21.

There are factors, other than noise, which cause malfunction. For example, there is a phenomenon in which a signal from the wireless master flash is small and light radiated from the wireless slave flash is reflected and made incident on the photosensor PS1. FIG. 11A relates to the process in which such a phenomenon occurs and shows waveforms obtained when the diode D22 is removed from the circuit shown in FIG. 4.

Suppose that the wireless master flash outputs a flash light signal and the photosensor of the wireless slave flash receives components of the wireless master flash signal, which have waveform components 91 to 94. Upon receiving the flash light signal, the wireless slave flash emits light and the photosensor receives waveform components 91' to 93' of reflection light of the wireless slave flash itself.

The voltage $V_{PS}$ at the resistor R21 has a waveform, as shown in the third composite waveform (light reception signal $V_{PS}$) in FIG. 11A. The signal waveform of $V_{PS}$, however, gradually decreases with the passing of time owing to the function of the capacitor C21 of the differential circuit.

The reason for this is that the differential circuit of the capacitor C21 and resistor R22 has such characteristics as to eliminate the DC component. Consequently, the signal level gradually decreases, as indicated by the waveform of $V_{PS}'$. As a result, the wireless master flash signal component indicated by waveform 94 cannot be detected.

The diode D22 shown in FIG. 4 is inserted to prevent this phenomenon. The effect of the diode D22 is obvious from the waveforms shown in FIG. 11B.

Specifically, like the waveform shown in FIG. 11A, the light receiving signal $V_{PS}$ at H-level decreases with the passing of time. However, when the light reception signal $V_{PS}$ is at L-level, it does not decrease below a predetermined voltage (i.e. below the GND-level in this circuit) by virtue of the diode D22. The reason is that if the signal $V_{PS}$ decreases below the GND-level, a current begins to flow to the capacitor C21 via the diode D22.

The signal of the wireless master flash can be detected by the diode D22 without fail, and malfunction of the wireless slave flash can be prevented, as can be understood from the waveforms 91' to 94' of the wireless slave flash reflection light components shown in FIG. 11B.

With reference to the flow charts of FIGS. 12 through 17, the operation of the CPU 62 in the above embodiment will now be described. In the following description, the time consumed in each step is ignored. In fact, there is a case where the time necessary for processing cannot be ignored. However, it is supposed that the time needed for processing is zero for the purpose of clearer, easier descriptions. Of course, the time needed for processing is considered in the actual program.

Figure 12:
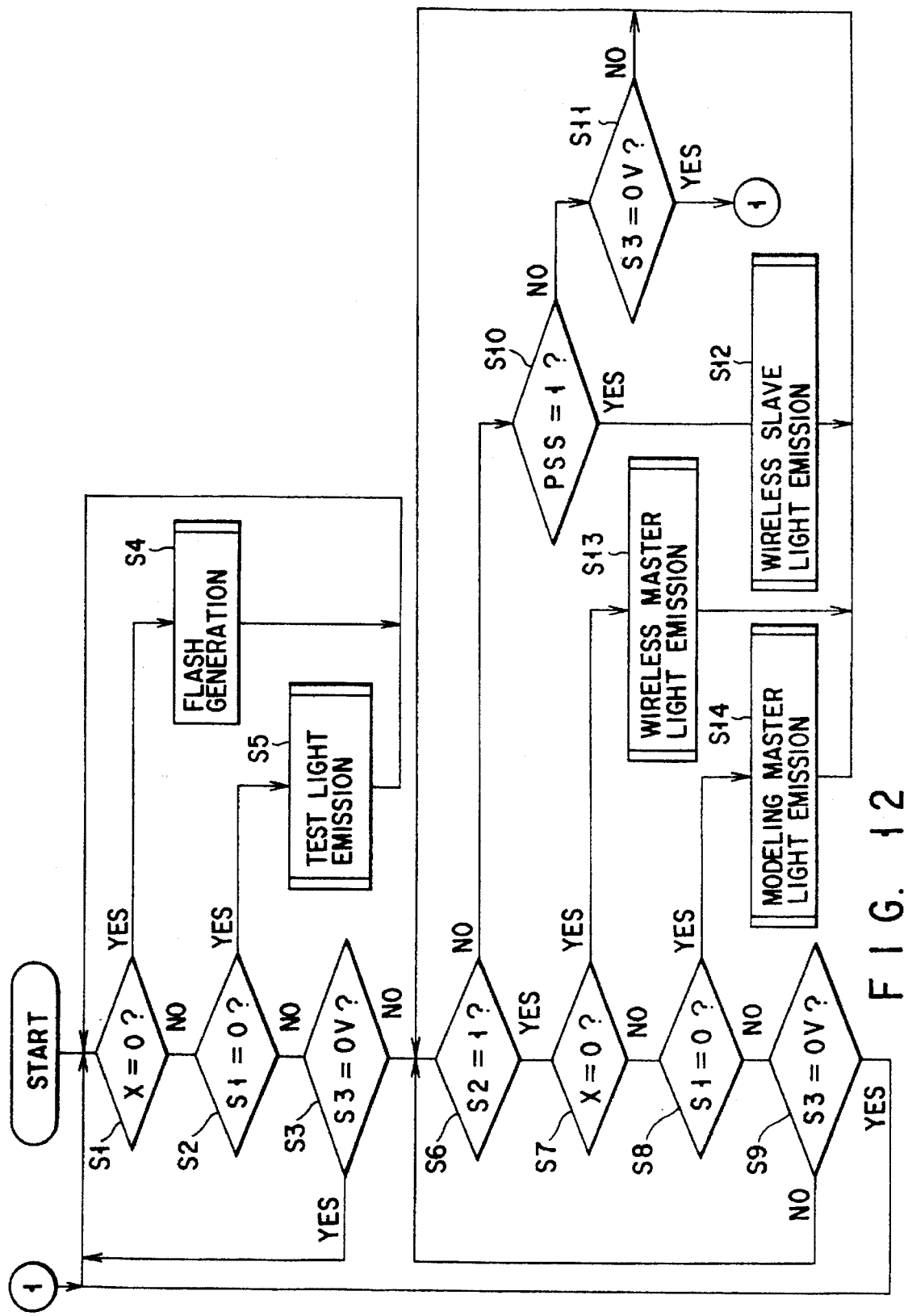
FIG. 12 is a flow chart illustrating the operation of a CPU 24 in the embodiment of the invention.

Upon receiving power supply voltage $V_{CC}$ from the power supply circuit 42, the CPU 62 starts to operate in accordance with a main routine illustrated in FIG. 12.

In steps S1 to S3, the CPU 62 waits for the signal X or the signal from the test light emission switch SW1 in the state in which the switch SW3 is set in the "NORM" mode.

Specifically, in step S1 the CPU 62 determines whether the terminal X is at "0" (corresponding to L-level of the signal). If YES in step S1, the control goes to a subroutine of "flash generation" in step S4. If the terminal is at "1" (corresponding to H-level of the signal), the control goes to step S2. In step S2, it is determined whether the signal S1 is at "0". If YES in step S2, the control goes to a subroutine of "test light emission" in step S5. If the signal S1 is at "1", the control goes to step S3.

In step S3, it is determined whether the signal S3 is at 0 V by A/D conversion. If YES in step S3, the "NORMAL" mode is determined and the control returns to step S1. On the other hand, if the signal S3 is not 0 V and the wireless flash mode is determined, the control goes to step S6.

When the subroutine in step S4 or S5 is completed, the control returns to step S1.

Steps S6 to S9 constitute a subroutine in the wireless flash generation mode. In step S6, it is determined whether the signal S2 is at "1". If YES in step S6, the control goes to step S7 and the operation of the wireless master flash is carried out. If the signal S2 is at "0", the control goes to step S10 and the operation of the wireless slave flash is carried out.

In step S7, the signal at the terminal X is detected. If this signal is at "0", the control goes to the process of "wireless master light emission" in step S13. In step S8, the signal S1 is detected. If the signal S1 is at "0", the control goes to the process of "modeling master light emission" in step S14. If the signal S1 is not at "0", the control goes to step S9 and the voltage value of the signal S3 is detected. If the voltage of signal S3 is 0 V, the control returns to step S1. Otherwise, the control returns to step S6.

If the signal S2 is at "0" in step S6, the control goes to the routine of steps S10 and S11 to carry out the operation of the wireless slave flash.

In step S10, if the signal PSS is at "1", the control advances to a subroutine of "wireless slave light emission" in step S12. If the signal PSS is at "0", the control goes to step S11 to detect the voltage value of the signal S3. In step S11, if the voltage of the signal S3 is 0 V, the control goes to step S1. Otherwise, the control returns to step S6.

After the subroutines of steps S12, S13 and S14, the control returns to step S6.

FIG. 13 shows the subroutine of the flash generation.

In step S21 of the flash generation subroutine, the timer is set at 10 msec. In step S22, the signal STC is set ("set" refers to switching of the signal from "0" to "1" and "reset" refers to switching from "1" to "0") and starts light emission.

In steps S23 and S24 after the light emission, the control stands by until the signal at the terminal TTL is set at "0" or the time set by the timer in step S21 is over (i.e. 10 msec has passed). After steps S23 and S24, the control goes to step S25 to reset the signal STC. That is, the light emission is stopped. Then, the control returns to the main routine.

FIG. 14 illustrates the subroutine of the test light emission operation.

In the test light emission subroutine, the timer is set for 100 μsec in step S31. In step S32, the signal STC is set to start light emission. In step S33, the control stands by until the time set by the timer is over. In step S34, the signal STC is reset, i.e. the light emission is stopped. Then, the control returns to the main routine.

Figure 15:
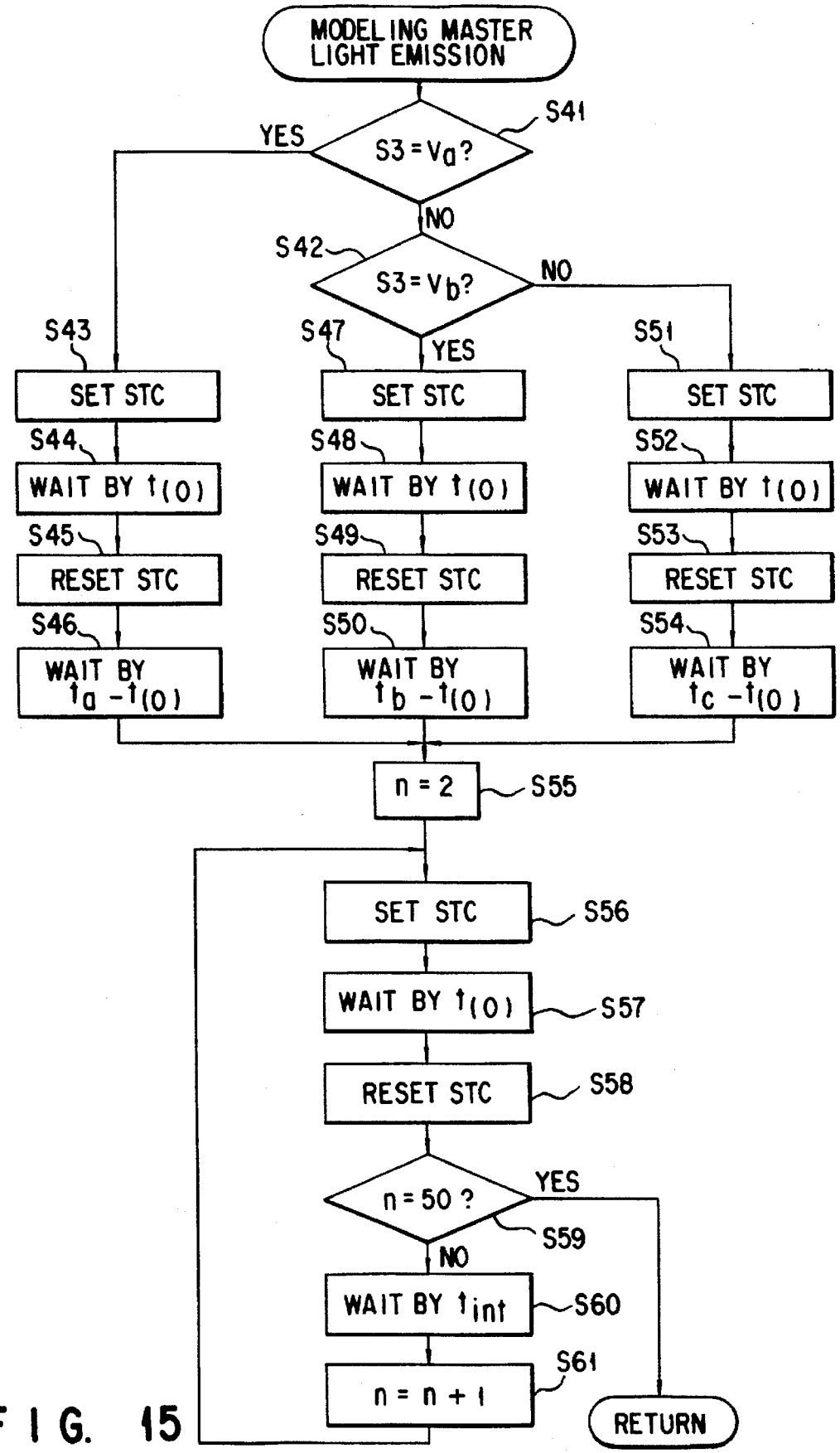
FIG. 15 is a flow chart illustrating a subroutine of the operation of modeling master light emission.

With reference to FIG. 15, the subroutine of the modeling master light emission will now be described.

At first, in steps S41 and S42, the voltage value of the signal S3 is detected. The control routine is branched according to the detected voltage value. If $S3=V_a$, the control goes to step S43, i.e. the step of processing the signal output of channel "a". If $S3=V_b$, the control goes to step S47, i.e. the step of processing the signal output of channel "b". If S3 assumes another value (i.e. $V_c$), the control goes to step S51, i.e. the step of processing the signal output of channel "c".

In the channel "a," a first light pulse is output in steps S43 to S45. Specifically, the control waits by time $t_{(o)}$ from the setting of STC ("start of light emission") in step S43 to the resetting of STC ("stop of light emission") in step S45. Thus, the light pulse is emitted during time $t_{(o)}$. Then, the control waits by time $t_a-t_{(o)}$ in step S46 and goes to step S55.

Steps S47 to S49 of channel "b" are the same as steps S43 to S45 of channel "a". Step S50 alone differs from step S46. Thus, the description of the operation in steps S47 to S49 is omitted. In step S50, after the first light pulse is output, the control waits by time $t_b-t_{(o)}$.

Similarly, in the channel "c," steps S51 to S53 are the same as steps S43 to S45 of the channel "a" and the description thereof is omitted. Unlike the channel "a," the control waits by time $t_c-t_{(o)}$ in step S54 after the first light pulse is emitted.

In step S55, the variable n is set at 2, and the control goes to the routine of steps S56 to S61.

In steps S56 to S58, a light pulse is output during time $t_{(o)}$. Then, in step S59, if n=50, the subroutine of "modeling master light emission" is completed. Unless n=50, the control goes to step S60 and waits by time $t_{inr}$. In step S61, n is set at n+1, and the control returns to step S56.

Through the above operations, the intermittent successive light can be output, as shown in FIG. 7. Specifically, by setting the channels "a" to "c," the time intervals between the first two light pulses are set at $t_a$, $t_b$ and $t_c$. Then, 48 light pulses are output at a time interval $t_{inr}$. The emission time of each light pulse is $t_{(0)}$.

Figure 16:
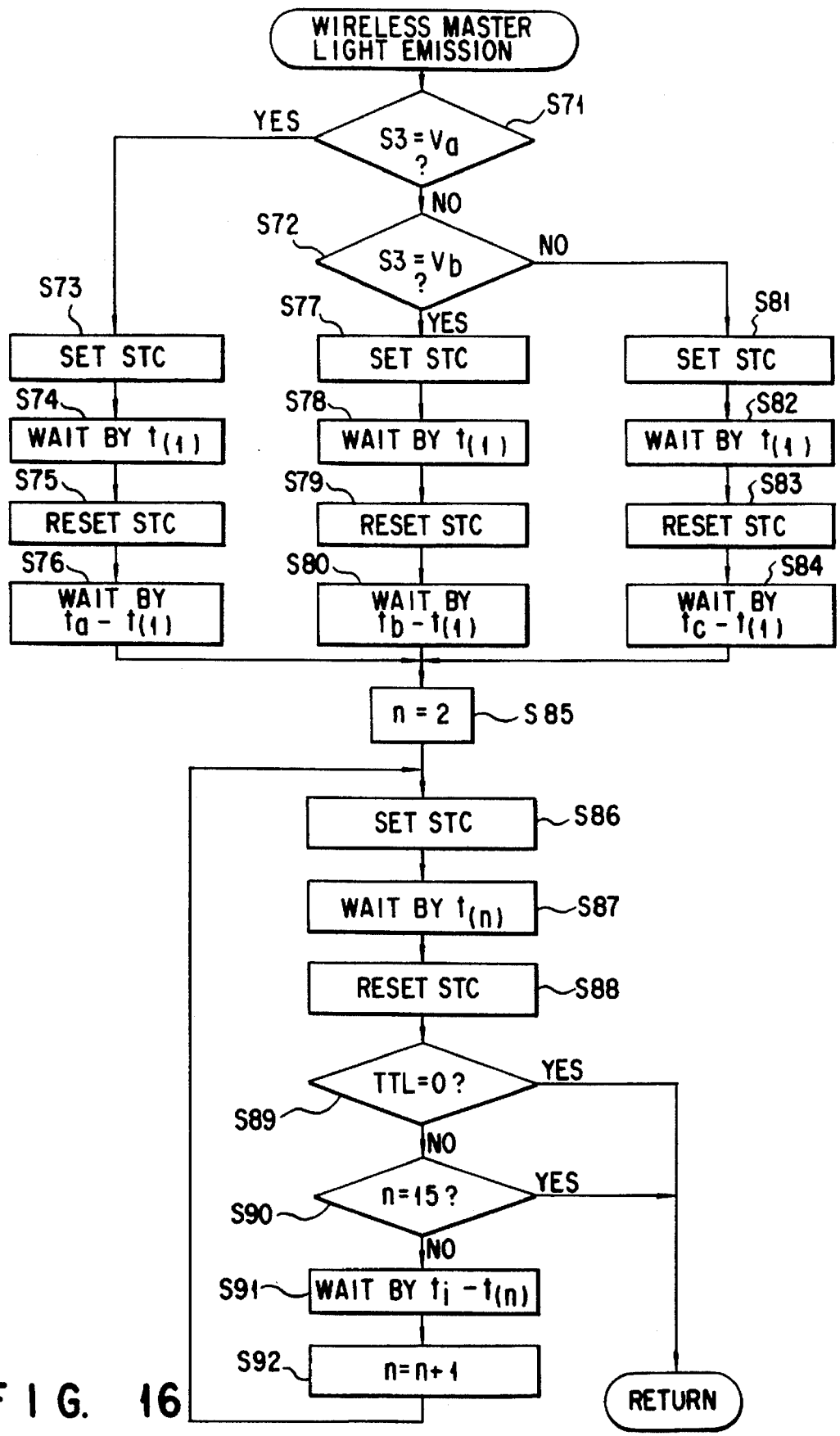
FIG. 16 is a flow chart illustrating a subroutine of the operation of wireless master light emission.

With reference to FIG. 16, the subroutine of "wireless master light emission" will now be described.

At first, in steps S71 and S72, the voltage value of the signal S3 is detected. The control routine is branched according to the detected voltage value. If $S3=V_a$, the control goes to step S73, i.e. the step of processing the signal output of channel "a". If $S3=V_b$, the control goes to step S77, i.e. the step of processing the signal output of channel "b". If S3 assumes another value (i.e. $V_c$), the control goes to step S81, i.e. the step of processing the signal output of channel "c".

In the channel "a," a first light pulse is output in steps S73 to S75. Specifically, the control waits by time $t_{(1)}$ from the setting of STC ("start of light emission") in step S73 to the resetting of STC ("stop of light emission") in step S75. Thus, the light pulse is emitted during time $t_{(1)}$. Then, the control waits by time $t_a-t_{(1)}$ in step S76 and goes to step S85.

Steps S77 to S79 of channel "b" are the same as steps S73 to S75 of channel "a". Step S80 alone differs from step S76. Thus, the description of the operation in steps S77 to S79 is omitted. In step S80, after the first light pulse is output, the control waits by time $t_b-t_{(1)}$.

Similarly, in the channel "c" steps S81 to S83 are the same as steps S73 to S75 of the channel "a" and the description thereof is omitted. Unlike the channel "a," the control waits by time $t_c-t_{(1)}$ in step S84 after the first light pulse is emitted.

In step S85, the variable n is set at 2, and the control goes to the routine of steps S86 to S92.

In steps S86 to S88, a light pulse is output during time $t_{(n)}$. Then, if the signal at terminal TTL is at "0" in step S89 or if n=15 in step S90, the subroutine of "wireless master light emission" is completed. Otherwise, the control goes to step S91 and waits by time $t_i-t_{(n)}$ and n is set at n+1 in step S92. Thus, the control returns to step S86.

Through the above operations, the intermittent successive light can be output, as shown in FIG. 8. Specifically, by setting the channels "a" to "c," the time intervals between the first two light pulses are set at $t_a$, $t_b$ and $t_c$. Then, 13 light pulses at maximum are output at a time interval $t_i$. The emission time periods of these light pulses are $t_{(1)}$ to $t_{(15)}$. However, if a "0" signal is input from terminal TTL, the light emission is stopped.

Figure 17A:
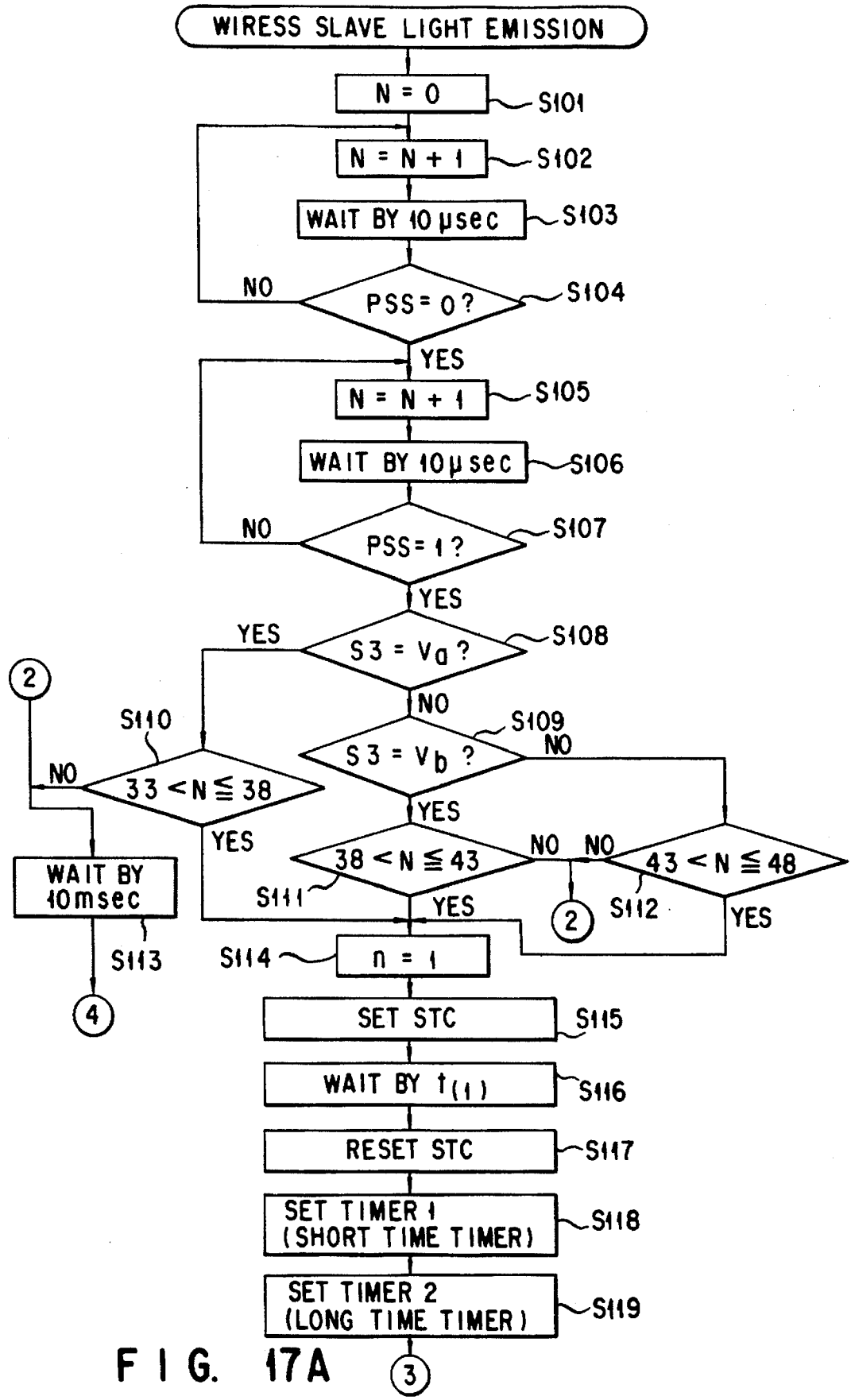
FIG. 17A and FIG. 17B are flow charts illustrating a subroutine of the operation of wireless slave light emission.
Figure 17B:
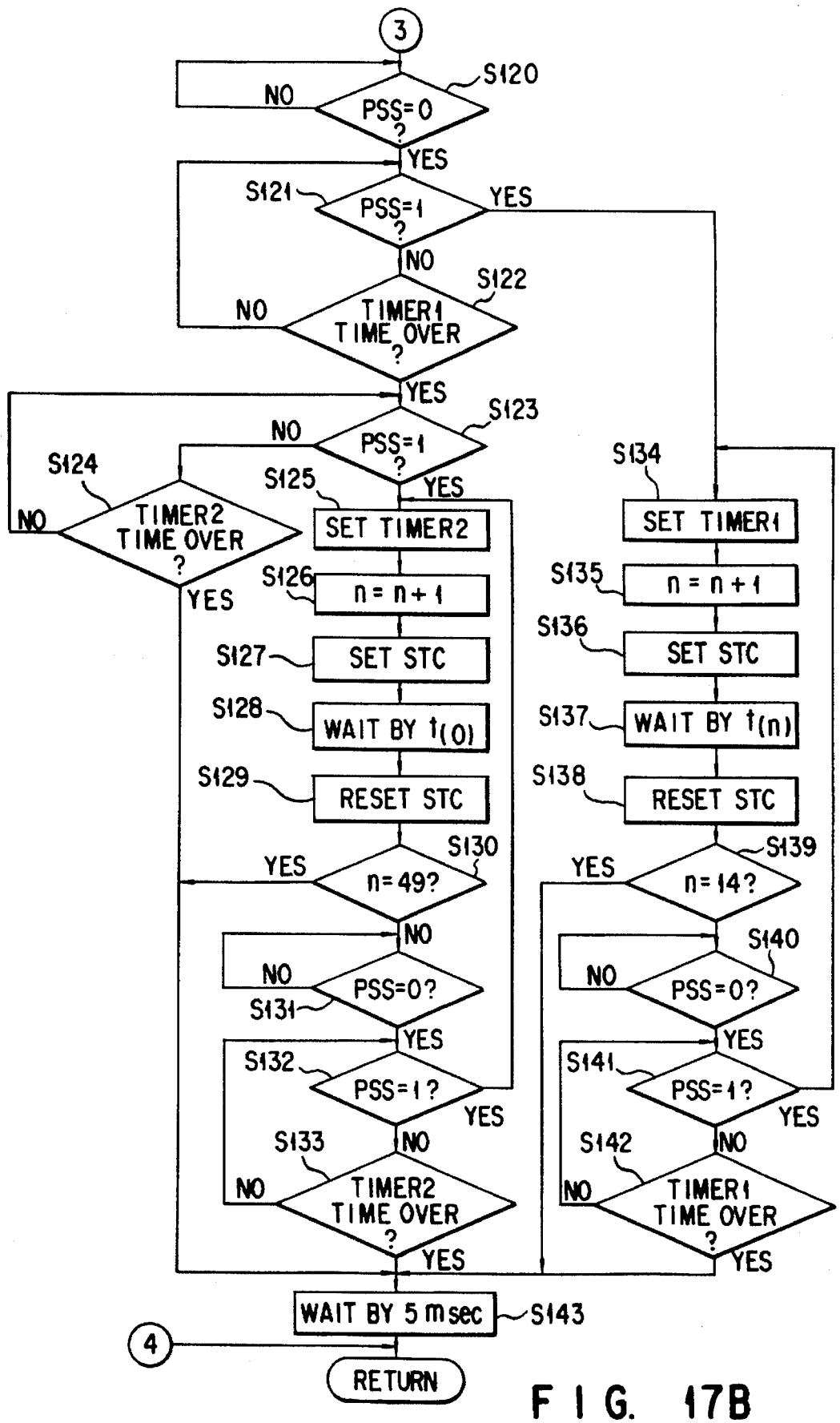

FIGS. 17A and 17B illustrate the subroutine of "wireless slave light emission".

The control enters this routine unless the signal S3 is set at "NORM" and when the signal S2 is at "0" (i.e. switch SW2 is set at "S") and the signal from the light receiving circuit 25 is "1". In other words, this subroutine is started when the wireless slave flash is selected and a light pulse signal from the wireless master flash is detected.

In steps S101 to S107, the time interval between the first light pulse and the second light pulse is measured in the following manner.

In step S101, the variable N is set at "0". In steps S102 to S104, the variable N is incremented by 1 at every 10 μsec until the signal PSS goes to "0" (i.e. until it becomes impossible to detect the first light pulse signal). In steps S105 to S107, the variable N is incremented by 1 at every 10 μsec until the signal PSS goes to "1" (i.e. until the next light pulse is detected). Specifically, the value of N indicates a time duration between the first light pulse to the next light pulse.

In steps S108 and S109, the set state of the signal S3 is detected. If $S3=V_a$, the channel "a" is determined and the control goes to step S110. If $S3=V_b$, the channel "b" is determined and the control goes to step S111. In other cases, the channel "c" is determined and the control goes to step S112.

In the case of the channel "a," it is determined in step S110 whether N is in the range of $33<N\leq38$. In the case of the channel "b," it is determined in step S111 whether N is in the range of $38<N\leq43$. In the case of the channel "c," it is determined in step S112 whether N is in the range of $43<N\leq48$. The control goes to step S114 in the case of the channel "a" when the time between the first light pulse and the next light pulse is about 350 μsec. The control goes to step S114 in the case of the channel "b" when the time between the first light pulse and the next light pulse is about 400 μsec. The control goes to step S114 in the case of the channel "c" when the time between the first light pulse and the next light pulse is about 450 μsec. In other cases, the control advances to step S113 and, after waiting for 10 msec, goes out of this subroutine.

The reason why the control waits for 10 msec in step S113 is as follows. If the control returns to the main routine immediately after the channel other than channels "a", "b" and "c" is determined, the control shortly goes to this subroutine once again. Depending on the timing of returning, the channel is erroneously recognized and the light emission may be effected in an interrupting manner. In particular, when the pulse signal is quickly sent from the wireless master flash, this possibility is high because the temporal difference between the recognition signal and the light emission interval in the intermittent light emission mode cannot be increased. If the non-coincidence is detected at least in the first recognition, erroneous light emission is prevented by prohibiting the detection of the light reception signal during the time enough to complete the light emission control.

In step S114, the variable n is set at "1" and a light pulse is output during time $t_{(1)}$ in steps S115 to S117. Then, a short-time timer 1 (not shown) is set in step S118 and a long-time timer 2 (not shown) is set in step S119. For example, the timer 1 is set for 400 μsec and the timer 2 is set for 30 msec. The time set in the timer 1 is longer than the light emission interval in the wireless master light emission mode, and the time set in the timer 2 is longer than the light emission interval in the modeling master light emission mode.

In step S120, the control waits until the signal PSS from the light receiving circuit 72 goes to "0". In steps S121 and S122, the control routine is branched, depending on whether the signal PSS goes to "1" before the time set in the timer 1 has passed. If the signal PSS has gone to "1" before the time passes over, the control advances to step S134 and light is emitted in synchronism with the master slave light emission of the wireless master flash. On the other hand, if the time set in the timer 1 has passed before the signal PSS goes to "1", modeling light emission is performed in synchronism with the modeling master light emission of the wireless master flash.

In the routine of steps S123 and S124, the control waits until the signal PSS goes to "1". If the signal PSS has gone to "1" before the time set in the timer 2 passes over, the control goes to step S125. If the time set in the timer 2 has passed over before the signal PSS goes to "1", the control goes to step S143.

In step S125, the timer 2 is set once again (e.g. for 30 msec). In step S126, 1 is added to the variable n. In steps S127 to S129, a light pulse is output during time $t_{(0)}$. If n=49 in step S130, the control goes to step S143. Otherwise, the control goes to step S131.

In step S131, the control waits until the signal PSS is set at "0". In the routine of steps S132 and S133, the control waits until the signal PSS is set at "1". If the time set in the timer 2 has passed over before the signal PSS goes to "1", the control advances to step S143. If the PSS has gone to "1" before the time passes over, the control goes to step S125.

Since a light pulse of a predetermined light amount is output each time the light pulse of the modeling master light emission from the wireless master flash has been detected in steps S125 to S133, the object can be irradiated in synchronism with the light emission of the wireless master flash.

On the other hand, in steps S121 and S122, if the signal PSS goes to "1" before the time set in the timer 2 passes over, the routine goes to step S134 and the timer 1 is set once again (e.g. for 400 μsec). In step S135, 1 is added to the variable n. A light pulse is output during time $t_{(n)}$ in steps S136 to S138.

In step S139, if n=14, the control advances to step S143. Otherwise, the control goes to step S140 and waits until the signal PSS goes to "0". In the routine of steps S141 and S142, the control waits until the signal PSS goes to "1". If the time set in the timer 1 has passed over before the signal PSS goes to "1", the control advances to step S143. If the PSS has gone to "1" before the time passes over, the control returns to step S34.

Since a light pulse of a predetermined light amount is output each time the light pulse of the master flash light emission from the wireless master flash has been detected in steps S134 to S142, the object can be irradiated in synchronism with the light emission of the wireless master flash.

In step S143, the control waits for 5 msec. Then, the subroutine is completed.

The operation for performing wireless flash photographing using the above-described flash devices will now be described.

The photographer connects one of two or more flash devices to the camera via a hot shoe or the like, as shown in FIG. 2. The other flash devices are situated at other locations, being not connected to the camera. The switch SW3 of the flash device $20_1$, i.e. the wireless master flash WMF, is set at "a", "b" or "c" and the switch SW2 thereof is set at "M". The switch SW3 of the flash device $20_2$ not connected to the camera, i.e. the wireless slave flash WSF, is set in the same position as the wireless master flash WMF and the switch SW2 thereof is set at "S".

While viewing the finder of the camera body 10, the photographer depresses the test switch 24 of the wireless master flash WMF. Thus, the wireless master flash WMF and wireless slave flash WSF perform intermittent successive light emission at an interval of 22 msec. Since the interval of light emission is 22 msec and 50 light pulses are emitted, the total emission time is given by 22 msec×50=1.1 sec Thus, the photographer can confirm in advance the shade and light intensity for flash photographing. Accordingly, the photographer can move the flash device to a position where a proper amount of light can be radiated.

After the flash device is situated at a proper position, the photographer pushes the shutter button and can perform flash photographing, as confirmed in advance. When the shutter button has been pushed and a light emission start signal has been sent from the camera body 10 to the wireless master flash WMF via the terminal X, the wireless master flash WMF starts master slave light emission. The wireless slave flash WSF receives the light signal and starts intermittent light emission in synchronism with the wireless master flash WMF. When the light reception amount of the film reaches a predetermined value, the camera body 10 outputs a light emission stop signal to the wireless master flash WMF via the terminal TTL and the wireless master flash WMF stops light emission. At this time, the wireless slave flash WSF becomes unable to detect the light pulse from the wireless master flash WMF and stops light emission simultaneously.

In the above embodiment, the IGBT is used as a switching element for light emission control. However, a thyristor, an FET, etc. may be substituted.

Figure 18:
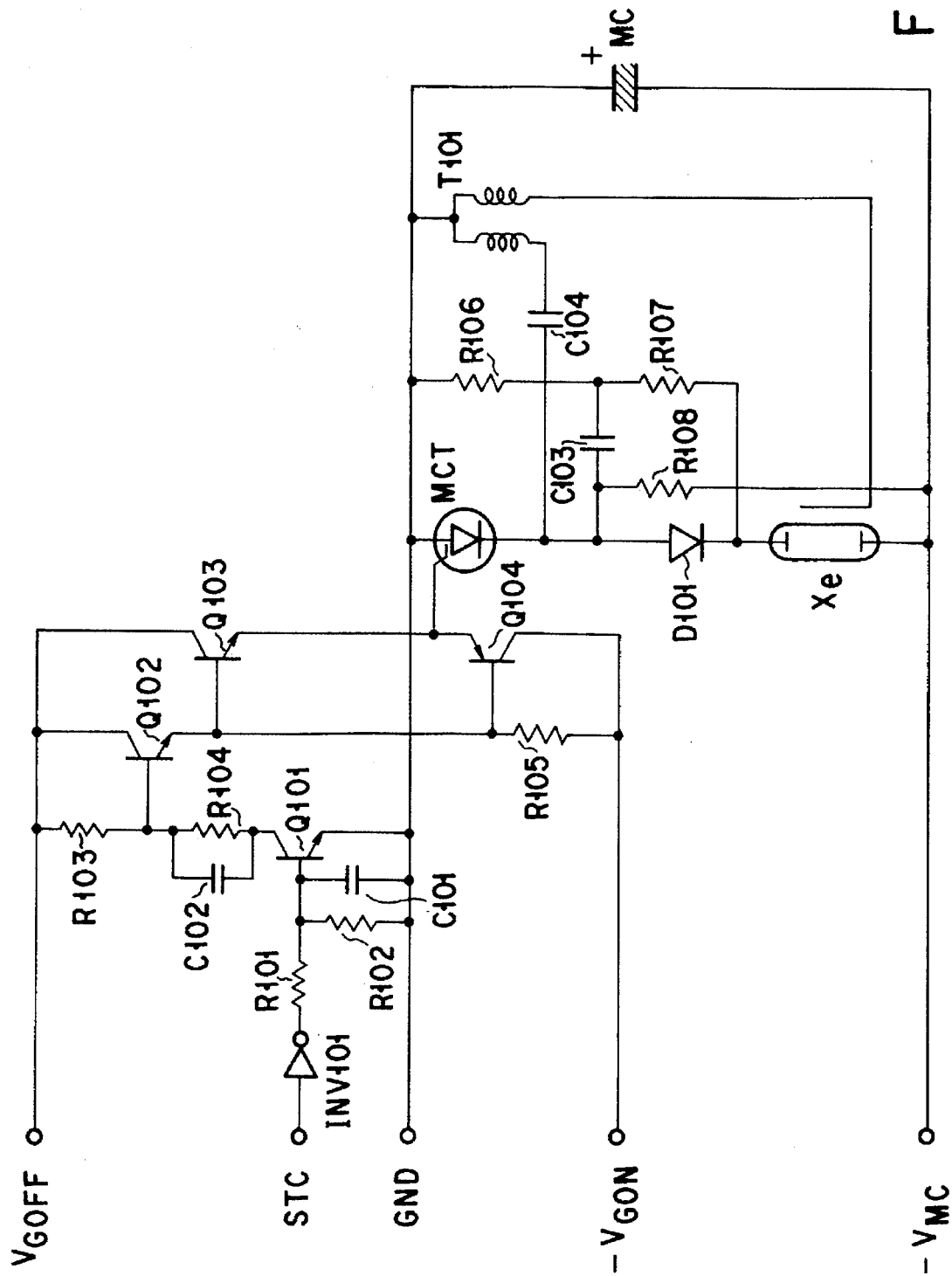
FIG. 18 is a circuit diagram showing the structures of a light emission circuit using an MCT (MOS Controlled Thyristor) and an MCT driver circuit.

FIG. 18 is a circuit diagram showing a light emission circuit using a P-channel MCT (MOS Controlled Thyristor) and an MCT driver circuit.

An MCT and an IGBT require different power supplies. The IGBT can be turned on/off by a single power supply of 0 to $V_{IGBT}$, but the MCT requires two power supplies of $-V_{GON}$ to $-V_{GOFF}$. If $-V_{GON}$ is applied to the gate terminal of the MCT, the MCT is turned on. If $-V_{GOFF}$ is applied, the MCT is turned off. The MCT driver is basically a complementary push-pull driver, like the IGBT driver. The operation thereof will now be described.

The control terminal STC is a terminal via which the CPU controls the MCT. When the terminal STC is at "H" level, the MCT is turned on. When the terminal STC is at "L" level, the MCT is turned off. When the terminal is at "H" level, the signal from the terminal STC is set at "L" level by an inverter INV101 and a transistor Q101 is turned off. As a result, a transistor Q102 is also turned off.

Accordingly, the base potential of each of complementary two transistors Q103 and Q104 is set at $-V_{GON}$. Thus, the transistor Q104 is turned on and the transistor Q103 is turned off. As a result, a voltage of $-V_{GON}$ is applied to the gate of the MCT and the MCT is turned on.

On the other hand, when the terminal STC is at "L" level, the signal from the terminal STC is set at "H" level by the inverter INV101 to allow a current to flow through the resistors R101 and R102, and the transistor Q101 is turned on. As a result, a current is allowed to flow through the resistors R103 and R104, the transistor Q102 is also turned on. When the transistor Q102 is turned on, a current is allowed to flow through the resistor R105, and a voltage of $+V_{GOFF}$ is applied to the a base of each of the transistors Q103 and Q104. The transistor Q103 is turned on and the transistor Q104 is turned off. Accordingly, a voltage of $+V_{GOFF}$ is applied to the gate of the MCT and the MCT is turned on. The capacitor C101 connected between the base and emitter of the transistor Q101 is provided for preventing the malfunction of the transistor Q101 due to noise. The capacitor C102 connected in parallel with the resistor R104 is a so-called speed-up capacitor provided so as to follow up the ON/OFF operation of the transistor Q101 at high speed.

The light emission circuit comprises a series circuit including a main capacitor MC, a discharge tube Xe, a diode D101 and an MCT; a trigger circuit consisting of a trigger capacitor C104 and a trigger transformer T101; and a voltage increasing circuit including resistors R106 to R108 and a capacitor C103. The main capacitor MC is connected to terminals GND and $-V_{MC}$, and is charged by a current from this terminal.

In this light emission circuit, when the MCT or switching element is turned on, the charge of the trigger capacitor C104 flows to the primary winding of the trigger transformer T101 and a high voltage is produced in the secondary winding of the trigger transformer T101. Thus, the discharge tube Xe is excited. At this time, the connection portion between the discharge tube Xe and diode D101 is instantaneously set at $+V_{MC}$ by the function of the voltage increasing circuit. Thus, a voltage of $+V_{MC}-(-V_{MC})=2V_{MC}$ is applied to the discharge tube Xe and the discharge tube Xe is made to easily emit light. In other words, only by controlling the MCT, can this circuit control the start/stop of light emission.

Figure 19:
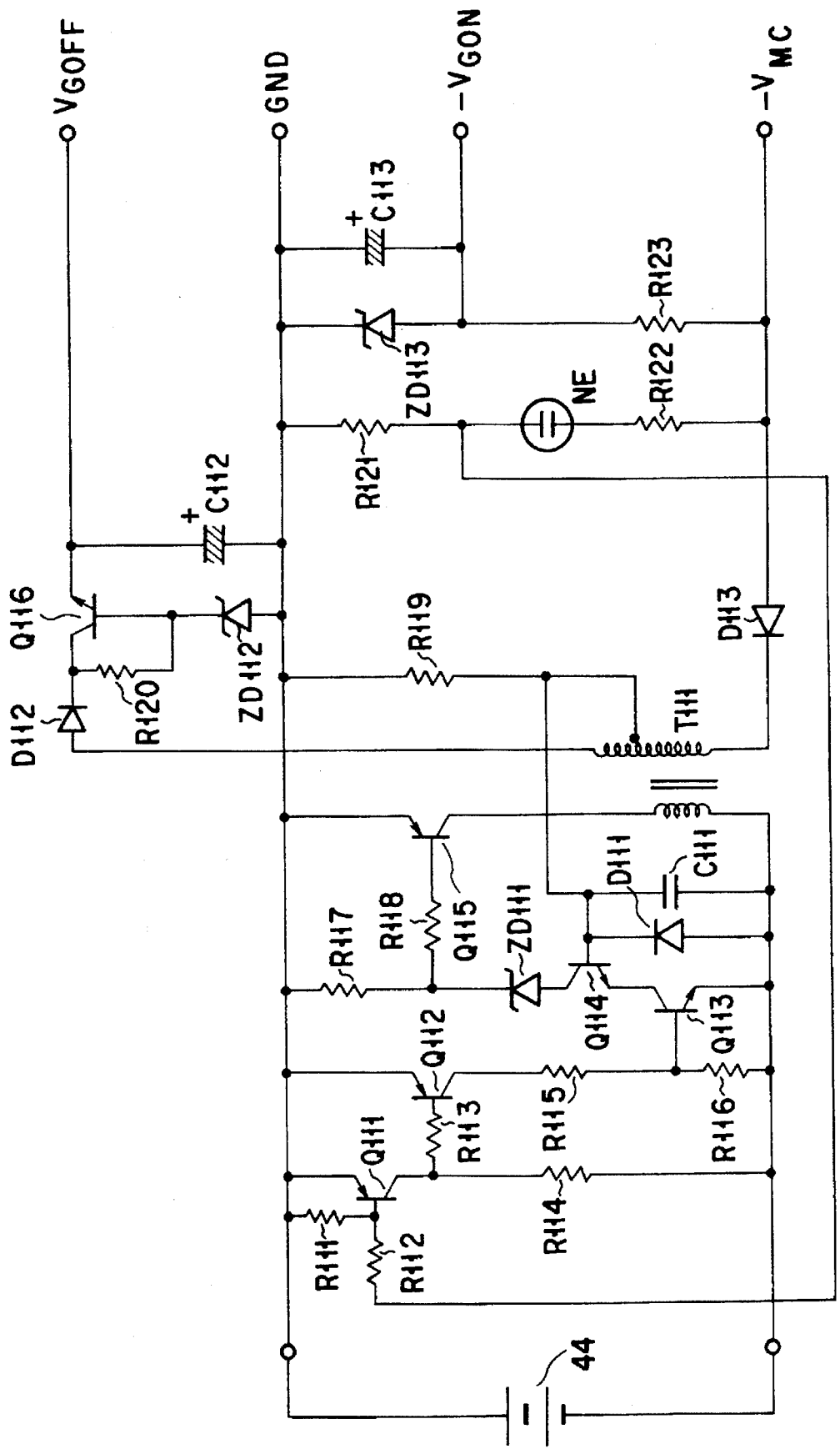
FIG. 19 is a circuit diagram showing the structure of a power supply circuit capable of driving the MCT.

FIG. 19 is a circuit diagram of a power supply circuit capable of outputting $-V_{GON}$ and $+V_{GOFF}$ as power for driving the MCT and charging the main capacitor.

This circuit can be divided into a primary-winding circuit section and a secondary-winding circuit section of a booster transformer T111.

The primary-winding circuit section comprises a circuit for permitting/prohibiting the boosting operation of the low-voltage power supply and a switching portion for turning on/off the primary side of the transformer T111. The circuit for permitting/prohibiting the boosting operation comprises transistors Q111 to Q113 connected to a battery 44 and resistors R111 to R116. When one terminal of the resistor R112 is at a GND-level, the transistor Q111 is turned off and the transistors Q112 and Q113 are turned on, thus permitting the boosting operation. On the other hand, when said one terminal of the resistor R112 is at a negative pressure level, the transistor Q111 is turned on and the transistors Q112 and Q113 are turned off, thus prohibiting the boosting operation.

The pressure boosting section comprises resistors R117 to R119, transistors Q114 and Q115, a constant voltage diode ZD111, a diode D111, a capacitor C111 and a booster transformer T111. The operation of this circuit starts when a current is supplied from the resistor R119 to the base of the transistor Q114. The transistor Q114 is turned on and the transistor Q115 is also turned on. If a current flows to the transistor Q115, a current flows to the primary winding of the transformer T111 and a high voltage occurs in the secondary winding.

At this time, a negative voltage occurs at the contact point between the transformer T111 and resistor R119, thereby turning off the transistor Q114. Then, the transistor Q115 is turned off to stop the current. The voltage value of the resistor R119 is restored, and a current flows to the transistor Q114 via the resistor R119. By repeating this operation, the booster circuit operates.

The high voltage occurring in the secondary winding is applied to the main capacitor MC shown in FIG. 18 via a rectifying diode D113 and a terminal $V_{MC}$, and the main capacitor MC is charged with the passing of time. When the main capacitor MC is charged up to a predetermined voltage (e.g. −300 V), the neon tube NE is turned on and the contact point between the resistors R121 and R122 is set at a negative voltage level. Thus, the transistor Q111 is turned on and the boosting operation is completed.

The voltage $+V_{GOFF}$ is produced while the transistor T111 charges the main capacitor MC. A predetermined positive voltage, e.g. +20 V, is produced by a rectifying diode D112, a transistor Q116, a resistor R120, a constant voltage diode D112 and a capacitor C112.

The voltage $-V_{GON}$, e.g. −10 V, is produced by a constant voltage diode ZD113, a resistor R123 and a capacitor C113 by making use of the charge accumulated in the main capacitor MC.

In the above embodiment, the wireless master flash (WMF) and the wireless slave flash (WSF) are the same. However, they may be constituted in different construction, as a matter of course.

In the above embodiment, the wireless master flash is mounted on the camera body. However, the wireless master flash may be built in the camera. Alternatively, each of the wireless master flash and the camera body may be provided with both functions and one of them may be selected.

Furthermore, in the above embodiment, the wireless master flash is mounted on the camera body. However, the wireless master flash may be connected to the camera body by means of a cable.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A wireless flash photographing system wherein a light emission control of a slave flash device situated apart from a camera can be effected by a light signal from a master flash device built in or mounted on said camera, comprising:

a master flash device including:
  (a) mixing means for mixing an identification signal for said slave flash device in said light signal;
  (b) light emission means for intermittently emitting light; and
  (c) master light emission control means for controlling at least light emission start and light emission stop of said light emission means in response to an output from said mixing means; and a slave flash device including:
  (a) light emission means for intermittently emitting light;
  (b) photoelectric conversion means for receiving the light signal and producing an output electric signal;
  (c) separating means, connected to said photoelectric conversion means, for separating said electric signal into an identification signal and a control signal;
  (d) timer means for measuring a predetermined time period; and
  (e) slave light emission control means for controlling light emission in response to said identification signal and said control signal, said slave light emission control means invalidating the output electric signal of said photoelectric conversion means for said predetermined time period measured by said timer means when said identification signal is judged to be not directed to said slave light emission control means itself.

2. The slave flash device according to claim 1, wherein said identification signal corresponds to a time interval of initial light pulses of said light signal.

3. A wireless flash photographing system wherein a light emission control of at least one second flash device situated apart from a camera is effected by a signal from a first flash device built in or externally mounted on said camera, said first flash device including:
  (a) input means for inputting a light emission start signal produced from said camera at the time of a photographing operation; and (b) light emission means for outputting an identification signal in response to said light emission start signal and, after a predetermined time interval, successively emitting light intermittently, and said second flash device including:
(a) a light receiving circuit for detecting intermittent light emission from said first flash device;
(b) a detection circuit for detecting the identification signal from an output signal of said light receiving circuit;
(c) light emission means for emitting light intermittently; and
(d) control means for making said light emission means emit light intermittently in synchronism with light emission of said first flash device at the time of film exposure, when said identification signal has been detected, said control means ignoring the output signal from the light receiving circuit for a predetermined time period when the signal output from the light receiving circuit of said second flash device has been determined to be different from the identification signal.

4. A wireless flash photographing system wherein a light emission control of a slave flash device situated apart from a camera can be effected by an identification signal and an optical pulse signal from a master flash device built in or mounted on said camera, comprising:

a master flash device including:
(a) light emission means for emitting said identification signal and said optical pulse signal;
(b) first light emission control means for controlling said light emission means to output a first identification signal including at least two optical pulses and a first optical pulse signal including a plurality of subsequent optical pulses, engagedly with a photographing operation of said camera and
(c) second light emission control means for controlling said light emission means to output a second identification signal including at least two optical pulses and a second optical pulse signal including a plurality of subsequent optical pulses, said second optical pulse signal having a light emission duration longer than that of said first optical pulse signal; and a slave flash device including:
(a) light receiving means for receiving said identification signal and said optical pulse signal;
(b) light emission means for intermittently emitting light;
(c) judging means for judging if said identification signal received by the light receiving means is a first identification signal or a second identification signal; and
(d) light emission control means for controlling an interval between light emissions of the intermittent light emission in accordance with said first optical pulse signal when the judging means judges the received signal to be the first identification signal, and controlling an interval between light emissions of the intermittent light emission in accordance with said second optical pulse signal when the judging means judges the received signal to be the second identification signal.

5. A wireless flash photographing system wherein a light emission control of a slave flash device situated apart from a camera can be effected by an identification signal and an optical pulse signal including a plurality of optical pulses, from a master flash device built in or mounted on said camera, comprising:

a master flash device including:
(a) light emission means for emitting said identification signal and said optical pulse signal;
(b) first light emission control means for controlling said light emission means to output an identification signal followed by a first optical pulse signal, with a first time interval between said identification signal and said first optical pulse signal, engagedly with a photographing operation of said camera;
(c) second light emission control means for controlling said light emission means to output said identification signal followed by a second optical pulse signal, with a second time interval between said identification signal and said second optical pulse signal, said second time interval and said second optical pulse signal having a light emission duration longer than those of said first time interval and said first optical pulse signal, respectively; and a slave flash device including:
(a) light receiving means for receiving said identification signal and said optical pulse signal;
(b) light emission means for emitting light intermittently;
(c) identification means for identifying if said identification signal received by the light receiving means is a predetermined identification signal;
(d) judging means for measuring a time interval to judge if an interval between said identification signal and optical pulse signal received by the slave flash device is said first time interval or said second time interval; and
(e) light emission control means for controlling a light emission time of intermittent light emission and an interval between light emissions of the intermittent light emission in accordance with said first pulse signal when the judging means judges the received signal to be the first time interval, and controlling a light emission time of intermittent light emission and an interval between light emissions of the intermittent light emission in accordance with said second pulse signal when the judging means judges the received signal to be the second time interval.

6. A wireless flash photographing system wherein a light emission control of at least one second flash device situated apart from a camera can be effected by a signal from a first flash device built in or externally mounted on said camera, comprising:

first flash device including:
(a) first input means for inputting a light emission start signal produced from said camera at a time of a photographing operation;
(b) second input means for inputting a light emission start signal produced from said camera irrespective of the photographing operation;
(c) time interval varying means for setting a first time interval when said first input means inputs said light emission start signal, and setting a second time interval which is longer than said first time interval when the second input means inputs said light emission start signal; and
(d) light emission means for successively emitting light intermittently at said first or second time interval determined by said time interval varying means; and a second flash device including:
(a) a light receiving circuit for detecting intermittent light emission from said first flash device; and
(b) light emission means for successively emitting light intermittently in synchronism with an output signal from said light receiving circuit.

7. The wireless flash photographing system according to claim 6, wherein said first flash device further comprises third input means for inputting a light emission stop signal produced from said camera at the time of an exposure operation, said first flash device stopping the light emission when the light emission stop signal has been input after the intermittent successive light emission was started.

8. The wireless flash photographing system according to claim 6, further comprising switching means, provided on one of said camera and said first flash device, for effecting switching between a wireless flash photographing mode and a normal single flash generation mode, said switching means, upon receiving the light emission start signal, selecting successive intermittent light emission in the wireless flash photographing mode and flash light emission in the flash generation mode.

9. The wireless flash photographing system according to claim 8, further comprising a test light emission switch provided on one of said camera and said first flash device, wherein said test light emission switch, when operated in the flash generation mode, makes the first flash device emit light for a predetermined time period or fully emit light, and said test light emission switch, when operated in the wireless flash photographing mode, makes the first and second flash devices successively emit light intermittently.

10. An improvement of a wireless flash photographing system wherein a light emission control of a slave flash device situated apart from a camera can be effected by a light signal from a master flash device provided on the camera side,
   (a) said master flash device including:
      identification signal generating means for generating an identification signal containing at least one of a selection signal for said slave flash device and a generation mode designation signal; and
      light emission control means for enabling intermittent light emission modulated on the basis of the identification signal, and
   (b) said slave flash device including:
      light receiving means for receiving the intermittent light from the master flash device;
      signal discriminating means for extracting the identification signal by demodulating the received light; and
      control means for controlling a light emission operation on the basis of the extracted identification signal, such that light is emitted in synchronism with light emission of the master flash device at the time of film exposure,
      wherein said slave flash device ignores the received light for a predetermined time period when the identification signal does not coincide with a predetermined identification code.

11. An improvement of a wireless flash photographing system wherein a light emission control of a slave flash device situated part from a camera can be effected by a light signal from a master flash device provided on the camera side,
   (a) said master flash device including:
      identification signal generating means for generating an identification signal containing at least one of a selection signal for said slave flash device and a generation mode designation signal;
      test light emission means for confirming a distribution of luminous light of an object to be photographed, made by light emission of said flash device, prior to film exposure; and
      light emission control means for enabling intermittent light emission modulated on the basis of the identification signal; and
   (b) said slave flash device including:
      light receiving means for receiving the intermittent light from the master flash device;
      signal discriminating means for extracting the identification signal by demodulating the received light; and
      control means for controlling a light emission operation on the basis of the extracted identification signal, such that light is emitted in synchronism with test light emission of the master flash device, for the film exposure, and performing test light emission in synchronism with the test light emission of said master flash device when said identification signal coincides with a test light emission signal,
      wherein said slave flash device ignores the received light for a predetermined time period when the identification signal does not coincide with a predetermined identification code.

12. A wireless flash photographing system comprising a master flash device built in or mounted on a camera and at least one slave flash device, separated from the camera, for emitting light under the control by a light signal from said master flash device,
   said master flash device including:
      (a) first signal generating means for generating a first signal in response to a light emission start signal produced at the time of a photographing operation;
      (b) second signal generating means for generating a second signal in response to a light emission start signal produced irrespective of the photographing operation;
      (c) light emission control means for generating one of a first intermittent pulse signal having a relatively short time interval when said first signal is generated, and a second intermittent pulse signal having a relatively long time interval when said second signal is generated; and
      (d) light emission means for emitting light intermittently in response to the signals from the light emission control means; and
   said slave flash device including:
      (a) light receiving means for receiving flash light from said master flash device;
      (b) light emission control means for controlling light emission in synchronism with the intermittent light emission of the master flash device, in response to an output from said light receiving means; and
      (c) light emission means for emitting light in response to an output from said light emission control means.

13. The wireless flash photographing system according to claim 12, wherein said master flash device further comprises third signal generating means for receiving a light emission stop signal and producing a third signal, and said light emission control means stops the intermittent light emission control upon receiving the third signal.

14. The wireless flash photographing system according to claim 12, wherein one of said camera and said master flash device further comprises:
   switching means for manually selecting one of a wireless flash mode and a flash generation mode,
   wherein said light emission control means generate flash without emitting light intermittently regardless of receiving an output from said first signal generation means or said second signal generation means, when said switching means selects the flash generation mode.

15. A wireless flash photographing system comprising a master flash device built in or mounted on a camera and a slave flash device, separated from the camera, for emitting light under the control by a light signal from said master flash device, said master flash device including:
(a) first signal generating means for generating a first signal;
(b) second signal generating means for generating a second signal;
(c) light emission means;
(d) light emission control means for controlling light emission at a predetermined series of time intervals in response to said first signal, and controlling light emission of said light emission means at a time interval longer than said predetermined series of time intervals in response to said second signal, and said slave flash device including:
(a) light receiving means for receiving flash light from said master flash device;
(b) light emission control means for varying a light emission interval in response to an output from said light receiving circuit; and
(c) light emission means for intermittently emitting light in response to an output from said light emission control means.

16. A wireless photographing system comprising a master flash device built in or mounted on a camera and at least one slave flash device, separated from the camera, for emitting light under the control by a light signal from said master flash device, said master flash device including:
(a) signal generating means for generating a signal in response to a light emission start signal;
(b) light emission means; and
(c) light emission control means for making said light emission means emit light according to a predetermined light emission pattern in response to an output from said signal generating means, and said slave flash device including:
(a) light receiving means for receiving flash light from said master flash device;
(b) light emission means;
(c) light emission control means for receiving an output signal from said light receiving means, said light emission control means controlling light emission of said light emission means when said output signal from the light receiving means has a predetermined signal pattern, and prohibiting or ignoring the output signal from the said light receiving means for a predetermined time period when the output signal from the light receiving means does not have said predetermined signal pattern.

* * * * *